US012665668B2

(12) United States Patent
Kaushal et al.

(10) Patent No.: US 12,665,668 B2
(45) Date of Patent: Jun. 23, 2026

(54) DISPERSION COMPENSATING DISCRETE PHASE FILTERS

(71) Applicant: FONEX DATA SYSTEMS INC., Saint Laurent (CA)

(72) Inventors: Saket Kaushal, North York (CA); José Azaña, Montreal (CA); Reza Maram, Montreal (CA); Mauricio Tosi, Buenos Aires (AR)

(73) Assignee: FONEX DATA SYSTEMS INC., Saint Laurent (CA)

( * ) Notice: Subject to any disclaimer, the term of this patent is extended or adjusted under 35 U.S.C. 154(b) by 160 days.

(21) Appl. No.: 18/702,202

(22) PCT Filed: Sep. 30, 2022

(86) PCT No.: PCT/CA2022/051455
§ 371 (c)(1),
(2) Date: Apr. 17, 2024

(87) PCT Pub. No.: WO2023/065010
PCT Pub. Date: Apr. 27, 2023

(65) Prior Publication Data
US 2025/0015892 A1 Jan. 9, 2025

Related U.S. Application Data

(60) Provisional application No. 63/262,660, filed on Oct. 18, 2021.

(51) Int. Cl.
*H04B 10/2513* (2013.01)
*H04B 10/2519* (2013.01)

(52) U.S. Cl.
CPC ... *H04B 10/25133* (2013.01); *H04B 10/2519* (2013.01)

(58) Field of Classification Search
CPC ..................... H04B 10/25133; H04B 10/2519
(Continued)

(56) References Cited

U.S. PATENT DOCUMENTS

| | | | | |
|---|---|---|---|---|
| 10,225,016 B1 * | 3/2019 | Khaleghi | ............ | H04J 14/0256 |
| 2003/0099423 A1 * | 5/2003 | Aflatooni | ........... | G02B 6/12007 |
| | | | | 385/27 |

(Continued)

FOREIGN PATENT DOCUMENTS

| | | | | |
|---|---|---|---|---|
| NL | 2010940 C2 * | 12/2014 | ......... | G01D 5/35316 |

OTHER PUBLICATIONS

Mahdi et al; Chromatic dispersion mitigation in long-haul fiber-optic communication networks by sub-band partitioning; Dec. 2015; Optics Express; pp. 1-10. (Year: 2015).*

(Continued)

*Primary Examiner* — Amritbir K Sandhu
(74) *Attorney, Agent, or Firm* — Bookoff McAndrews, PLLC

(57) ABSTRACT

Dispersion compensating phase filters, their method of manufacture and use are presented. The phase filters are designed to compensate for chromatic dispersion accumulated by a telecommunication optical signal when travelling in a dispersive line. The phase filter is made by first determining a target dispersion compensating phase profile of a channel of the telecommunication optical signal. This determination involves discretizing the phase profile of the dispersive line into a plurality of frequency sub-bands over a bandwidth of the channel, each frequency sub-band having a width selected on view of compensating the chromatic dispersion. For each frequency sub-band, an average phase value of the phase profile of the dispersive line is computed, and then converted to an equivalent 2Pi-bound phase value, used in building the target dispersion compensating phase (Continued)

profile. A spectral filtering structure embodying the target dispersion compensating profile is manufactured.

25 Claims, 18 Drawing Sheets

(58) Field of Classification Search
USPC ........................................................ 398/204
See application file for complete search history.

(56) References Cited

U.S. PATENT DOCUMENTS

| | | | |
|---|---|---|---|
| 2013/0016968 A1* | 1/2013 | Ohtani | H04B 10/25133 |
| | | | 398/81 |
| 2019/0072833 A1* | 3/2019 | Nejadriahi | G02F 1/225 |

OTHER PUBLICATIONS

K.P. Ho; Subband equalizer for chromatic dispersion of optical fibre; Nov. 2009, Electronics Letters vol. 45. No. 24; pp. 1-2. (Year: 2009).*
Wu et al; Chromatic Dispersion Equalization FIR Digital Filter for Coherent Receiver; Oct. 2021, MDPI Photonics, pp. 1-17. (Year: 2021).*
Cheng, Rui. Spectral tailoring of silicon integrated Bragg gratings. Thesis. University of British Columbia, Mar. 2020.
Crockett, Benjamin, Cortés, Luis Romero, et Azaña, José. Noise mitigation of random data signals through linear temporal sampling based on the talbot effect. In : Optical Fiber Communication Conference. Optica Publishing Group, 2019. p. M1B. 2.
Fernández-Pousa, Carlos R. A dispersion-balanced discrete Fourier transform of repetitive pulse sequences using temporal Talbot effect. Optics Communications, 2017, vol. 402, p. 97-103.
Zhao, Yanjing, Chen, Liao, Wang, Weiqiang, et al. Repetition rate multiplication control of micro-combs assisted by perfect temporal Talbot effect. APL Photonics, 2020, vol. 5, No. 4.
Jayaraman, Vijaysekhar, Chuang, Z.-M., et Coldren, Larry A. Theory, design, and performance of extended tuning range semiconductor lasers with sampled gratings. IEEE Journal of quantum electronics, 1993, vol. 29, No. 6, p. 1824-1834.
Kaushal, Saket et Azaña, José. Arbitrary dispersion compensation of periodic waveforms using on-chip discrete phase filters. In : 2021 Optical Fiber Communications Conference and Exhibition (OFC). IEEE, 2021., Th4B.3, p. 1-3.
Kaushal, Saket et Azaña, José. Design of ultra-compact on-chip discrete phase filters for broadband dispersion management. Journal of Lightwave Technology, 2021, vol. 39, No. 21, p. 6908-6921.
Kaushal, Saket et Azaña, José. On-chip dispersive phase filters for optical processing of periodic signals. Optics Letters, 2020, vol. 45, No. 16, p. 4603-4606.
Kaushal, Saket et Azaña, José. On-Chip Dispersive Phase Filters for Photonic Signal Processing. In : CLEO: Science and Innovations. Optica Publishing Group, 2020. p. SW30. 2.
Kaushal, Saket et Azaña, José. On-Chip Talbot-based Repetition-rate Multiplier. In : 2020 Photonics North (PN). IEEE, 2020., W7oT-183, p. 1-1.
Kaushal, Saket, Klitis, Charalambos, Sorel, Marc, et al. Passive Amplification of Data Signals using On-chip Dispersive Phase Filters in Silicon. In : 2020 European Conference on Optical Communications (ECOC). IEEE, 2020., Tu2B-6, p. 1-4.
Li, Hongpu, Sheng, Yunlong, Li, Yao, et al. Phased-only sampled fiber Bragg gratings for high-channel-count chromatic dispersion compensation. Journal of lightwave technology, 2003, vol. 21, No. 9, p. 2074-2083.
Lin, Zhixing, Sun, Shuqian, Li, Wei, et al. Temporal cloak without synchronization. IEEE Photonics Technology Letters, 2019, vol. 31, No. 5, p. 373-376.
Romero Cortés, Luis, Maram, Reza, Guillet De Chatellus, Hugues, et al. Arbitrary Energy-Preserving Control of Optical Pulse Trains and Frequency Combs through Generalized Talbot Effects. Laser & photonics reviews, 2019, vol. 13, No. 12, p. 1900176.
Salem, Reza, Foster, Mark A., et Gaeta, Alexander L. Application of space-time duality to ultrahigh-speed optical signal processing. Advances in Optics and Photonics, 2013, vol. 5, No. 3, p. 274-317.
Simard, Alexandre D., Strain, Michael J., Meriggi, Laura, et al. Bandpass integrated Bragg gratings in silicon-on-insulator with well-controlled amplitude and phase responses. Optics letters, 2015, vol. 40, No. 5, p. 736-739.
Skaar, Johannes, Wang, Ligang, et Erdogan, Turan. On the synthesis of fiber Bragg gratings by layer peeling. IEEE Journal of quantum electronics, 2001, vol. 37, No. 2, p. 165-173.
International Search Report and Written Opinion dated Nov. 30, 2022, issued in corresponding application PCT/CA2022/051455 by the Canadian Intellectual Property Office (7 pages).

* cited by examiner

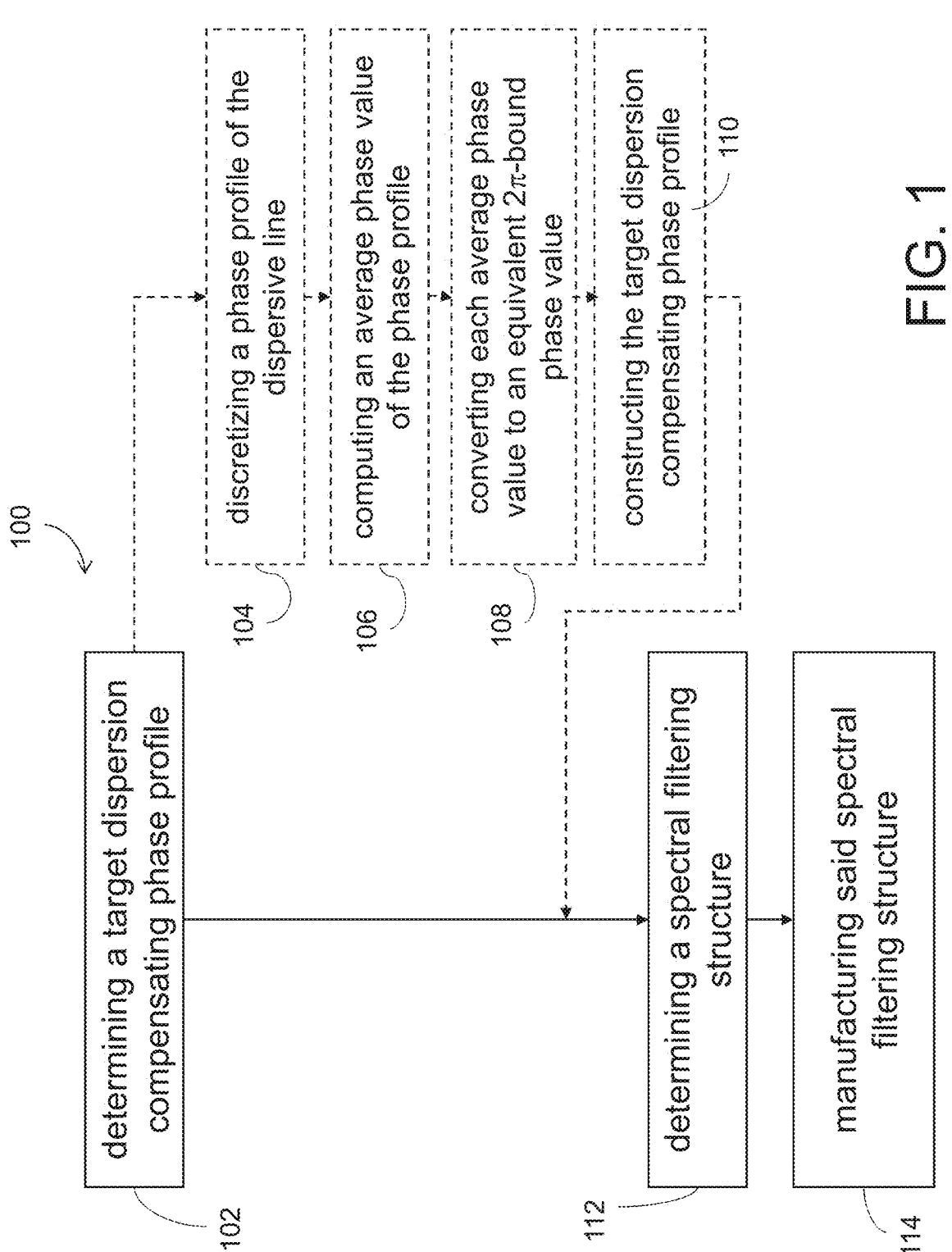

100

102 determining a target dispersion compensating phase profile 104 discretizing a phase profile of the dispersive line 106 computing an average phase value of the phase profile 108 converting each average phase value to an equivalent 2π-bound phase value 110 constructing the target dispersion compensating phase profile 112 determining a spectral filtering structure 114 manufacturing said spectral filtering structure

DISPERSION COMPENSATING DISCRETE PHASE FILTERS

CROSS-REFERENCE TO RELATED APPLICATION(S)

This is a National Stage Application under 35 U.S.C. § 371 of International Application No. PCT/CA2022/051455, filed Sep. 30, 2022, which claims priority to U.S. Patent Application No. 63/262,660, filed on Oct. 18, 2021.

TECHNICAL FIELD

The technical field generally relates to dispersion compensation of telecommunication optical signals and more particularly concerns dispersion compensating phase filter for a telecommunication optical signal accumulating chromatic dispersion when travelling in a dispersive line.

BACKGROUND

A typical optical communication system consists of a transmitter, a guiding medium (e.g., an optical fiber), and a receiver. The transmitter encodes the input electrical signal by external or direct modulation of a semiconductor laser, using either the return-to-zero (RZ) or nonreturn-to-zero (NRZ) modulation formats. In the RZ format, the pulse width remains constant, whereas it varies depending on the bit pattern in the case of the NRZ format. The NRZ format is commonly used in practice, as its associated bandwidth is smaller than the RZ format due to fewer on-off transitions. On-off keying (OOK) is the simplest modulation technique, wherein the laser power is simply switched between two levels (0 and 1). To improve the spectral efficiency of optical fiber links, modern lightwave systems employ advanced modulation techniques, such as quadrature phase shift keying (QPSK), pulse amplitude modulation (PAM), and quadrature amplitude modulation (QAM). The use of wavelength division multiplexing (WDM) with optical amplifiers has further reduced the overall cost of a optical fiber link while increasing the capacity of the communication system. WDM is a multiplexing scheme, in which multiple optical data streams are concurrently transmitted at different (typically equally spaced) wavelengths through a single optical fiber.

On the receiver side, the demodulator design is dependent on the modulation scheme used. QPSK and other advanced formats require complicated detection techniques based on heterodyne or homodyne demodulation. On the other hand, simple OOK-modulated data streams can be detected based on the principles of intensity modulation with direct detection (IM/DD), wherein a 0 or 1 is assigned to individual bits, based on the amplitude of the detected electrical signal. A common performance metric of an optical fiber link is the bit error rate (BER). BER is the rate at which errors occurs in a given transmission system. Assuming a Gaussian noise distribution, the BER is related to the Q-factor as, $$BER = \frac{1}{2}\,\mathrm{erfc}\left(Q/\sqrt{2}\right).$$

Here, Q-factor is the difference of the mean values of the two signal levels (a '0' and a '1' bit) divided by the sum of the noise standard deviations at the two levels.

Rapid advancements in both ultra-wideband optical-amplifier technology and advanced modulation formats have expanded the capacity of single mode fiber-based optical links to excess of 150 Tb/s. Despite these improvements, the chromatic dispersion-induced broadening/distortion of the data signals still remains a key impairment to be compensated for in WDM-based optical links, especially over medium-reach and long-haul networks. For example, in the case of RZ-OOK data signals, the group velocity dispersion (GVD)-limited transmission distance is given by:

$$L < \frac{1}{16\left|\beta_2 B^2\right|},$$

where $\beta_2$ the second-order dispersion (SOD) coefficient of the transmission line, e.g., a standard single-mode-fiber (SMF), and B is the bit rate. For a standard SMF, L can not exceed 1.2 km at a bit rate of 50 Gbps, when operating near 1550 nm.

Typically, GVD-induced signal degradation in WDM-based optical links is compensated by employing either electronic techniques based on digital signal processing (DSP) [M. U. Hadi, J. Nanni, J.-L. Polleux, P. A. Traverso, and G. Tartarini, "Direct Digital Predistortion Technique for the Compensation of Laser Chirp and Fiber Dispersion in Long Haul Radio over Fiber Links," Opt. Quantum Electron., vol. 51, no. 6, pp. 205, 2019], or through an optical (i.e., analog) linear dispersion management scheme comprising of periodic alignment of optical fibers (usually, dispersion compensating fiber, DCF) with an opposite GVD profile [S. Ramachandran, Fiber based Dispersion Compensation. Springer Science & Business Media, 2007]. DSPs-based dispersion compensation is a computationally expensive task—leading to power dissipation as well as introducing significant latency in the overall optical link. On the other hand, DCFs generally require tens of kms of fiber length, leading to non-zero insertion loss and latency in the link. They can also introduce additional nonlinear effects in the link. Alternatively, chirped fiber Bragg gratings (FBGs) can provide the target GVD profile in a relatively compact form (tens of cm long) by varying the grating period profile along the device length [R. Kashyap, Fiber Bragg Gratings. Academic press, 2009; BJ Eggleton, A. Ahuja, PS Westbrook, JA Rogers, P Kuo, TN Nielsen, B Mikkelsen, "Integrated Tunable Fiber Gratings for Dispersion Management in High-bit Rate Systems", J. Lightwave Technol., vol 18, no. 10, pp. 1418-1432, 2000.]. As the local Bragg wavelength varies along the length of the FBG, different frequency components of the input signal are reflected at different points along the grating length, thus introducing a linear group delay over a finite bandwidth (BW). For example, a 10-cm FBG can compensate for the chromatic dispersion of a 300 km of SMF over a BW of 25 GHz. Thus, compared to DCFs, FBGs offer lower insertion losses and reduced latency, albeit over a relatively narrow operation BW. Yet, FBGs typically require using an optical circulator, resulting in a setup that is still bulky and unsuitable for on-chip integration.

The use of a chirped waveguide Bragg grating (CWBG), which is the integrated implementation of an FBG, has been proposed and demonstrated as an efficient solution for GVD compensation [I. Giuntoni, D. Stolarek, D. I. Kroushkov, J. Bruns, L. Zimmermann, B. Tillack, and K. Petermann, "Continuously Tunable Delay Line based on SOI Tapered Bragg Gratings," Opt. Express, vol. 20, no. 10, pp. 11241-11246, 2012; G. Chen, T. Wang, C. Donnelly, and D. Tan, "Second and Third Order Dispersion Generation using Nonlinearly Chirped Silicon Waveguide Gratings," Opt. Express, vol. 21, no. 24, pp. 29223-29230, 2013.]. It is estimated that compensation of the GVD profile of a standard SMF with length just above 20 km over a 100-GHz WDM channel would require a chirped WBG with a length of at least 10 mm. This is a difficult target to realize in practice due to intrinsic waveguide losses and fabrication imperfections (e.g., random fluctuations in waveguide width) induced phase noise over longer device lengths. In a CWBG (or an FBG), the spectral phase accumulation limits the net amount of GVD and BW that can be compensated for. No compact integrated (on-chip) technology is presently available that can perform optical GVD compensation with the needed performance for practical applications in optical fibers telecommunication links.

There remains a need for a solution overcoming at least some of the limitations of the above approaches.

SUMMARY

In accordance with one aspect, there is provided a method of making a dispersion compensating phase filter for compensating for chromatic dispersion accumulated by a telecommunication optical signal when travelling in a dispersive line, the method comprising:

a) determining a target dispersion compensating phase profile of a channel of the telecommunication optical signal, said determining comprising:

i. discretizing a phase profile of the dispersive line into a plurality of frequency sub-bands over a bandwidth of the channel, each frequency sub-band having a width selected in view of compensating the chromatic dispersion;

ii. for each of said frequency sub-bands, computing an average phase value of the phase profile of the dispersive line;

iii. converting each average phase value to an equivalent $2\pi$-bound phase value for each of said frequency sub-bands; and iv. constructing the target dispersion compensating phase profile across the full bandwidth of the channel as the equivalent $2\pi$-bound phase value over each frequency sub-band;

b) determining spatial parameters of a physical spectral filtering structure having a spectral filtering phase profile substantially corresponding to the target dispersion compensating profile; and c) manufacturing said physical spectral filtering structure using said spatial parameters.

In some implementations, the phase profile of the dispersive line comprises a second-order dispersion term.

In some implementations, the phase profile of the dispersive line comprises at least one of a third-order dispersion term and a fourth-order dispersion term.

In some implementations, the discretizing of the phase profile of the dispersive line comprises selecting the width of each frequency sub-bands such that the phase profile of the dispersive line is substantially constant over said width.

In some implementations, the discretizing of the phase profile comprises selecting the width of each frequency sub-bands such that said width provides a target net group delay excursion of the dispersive line.

In some implementations, the discretizing of the phase profile of the dispersive line comprises selecting the width of each frequency sub-bands within a range having:

a minimum size dictated by a manufacturing technology platform used for the manufacturing of the physical spectral filtering structure; and a maximum size dictated by the chromatic dispersion to be compensated.

In some implementations, the frequency sub-bands of the discretized phase profile of the dispersive line are coterminous.

In some implementations, each average phase value of the phase profile of the dispersive line is computed as the center of the corresponding frequency sub-band.

In some implementations, converting each average phase value comprises dividing said average phase value by $2\pi$ and taking a remainder of said dividing as the equivalent $2\pi$-bound phase value.

In some implementations, the spectral filtering structure is designed for use in reflection.

In some implementations, the spectral filtering structure comprises a Bragg grating. The Bragg grating may be a waveguide Bragg grating (WBG) manufactured on a waveguide chip. In some embodiments, determining spatial parameters of the spectral filtering structure comprises modulating a distance between consecutive corrugations along the WBG. The Bragg grating may also be a Fiber Bragg Grating (FBG) manufactured in an optical fiber. In some embodiments, determining spatial parameters of a spectral filtering structure comprises using a spectral transfer function. Determining spatial parameters of a physical spectral filtering structure may comprise adding a phase-only sampling function to a refractive index profile of the Bragg grating, said phase-only sampling function being designed to extend a dispersion compensation ability of the filter to multiple channels of the telecommunication optical signal. The WBG may have a spiral geometry.

In some implementations, the spectral filtering structure comprises concatenated micro-elements manufactured on a waveguide chip.

In accordance with another aspect, there is provided a dispersion compensating phase filter for compensating for chromatic dispersion accumulated by a target telecommunication optical signal when travelling in a dispersive line, the filter comprising a physical spectral filtering structure having spatial parameters providing a spectral filtering phase profile substantially corresponding to a target dispersion compensating phase profile of a channel of the telecommunication optical signal, said target dispersion compensating phase profile being determined from:

a. discretizing a phase profile of the dispersive line into a plurality of frequency sub-bands over a bandwidth of the channel, each frequency sub-band having a width selected in view of compensating the chromatic dispersion;

b. for each of said frequency sub-bands, computing an average phase value of the phase profile of the dispersive line;

c. converting each average phase value to an equivalent $2\pi$-bound phase value for each of said frequency sub-bands; and d. constructing the target dispersion compensating phase profile across the full bandwidth of the channel as the equivalent $2\pi$-bound phase value over each frequency sub-band.

In some implementations, wherein the phase profile of the dispersive line comprises a second-order dispersion term.

In some implementations, the phase profile of the dispersive line comprises at least one of a third-order dispersion term and a fourth-order dispersion term.

In some implementations, the discretizing of the phase profile of the dispersive line comprises selecting the width for each frequency sub-bands such that the phase profile of the dispersive line is substantially constant over said width.

In some implementations, the discretizing of the phase profile comprises selecting the width of each frequency sub-bands such that said width provides a target net group delay excursion of the dispersive line and a target performance factor for a preset length and phase profile of the dispersive line.

In some implementations, the discretizing of the phase profile of the dispersive line comprises selecting the width of each frequency sub-bands within a range having:

a minimum size dictated by a manufacturing technology platform used for the manufacturing of the physical spectral filtering structure; and I a maximum size dictated by the chromatic dispersion to be compensated.

In some implementations, the frequency sub-bands of the discretized phase profile of the dispersive line are coterminous.

In some implementations, each average phase value of the phase profile of the dispersive line is computed as the center of the corresponding frequency sub-band.

In some implementations, converting each average phase value comprises dividing said average phase value by $2\pi$ and taking a remainder of said dividing as the equivalent $2\pi$-bound phase value.

In some implementations, the spectral filtering structure is designed for use in reflection.

In some implementations, the spectral filtering structure comprises a Bragg grating. The Bragg grating may be a waveguide Bragg grating (WBG) manufactured on a waveguide chip. In some embodiments, determining spatial parameters of the spectral filtering structure comprises modulating a distance between consecutive corrugations along the WBG. The Bragg grating may also be a Fiber Bragg Grating (FBG) manufactured in an optical fiber. In some embodiments, determining spatial parameters of a spectral filtering structure comprises using a spectral transfer function. Determining spatial parameters of a physical spectral filtering structure may comprise adding a phase-only sampling function to a refractive index profile of the Bragg grating, said phase-only sampling function being designed to extend a dispersion compensation ability of the filter to multiple channels of the telecommunication optical signal. The WBG may have a spiral geometry.

In some implementations, the spectral filtering structure comprises concatenated micro-elements manufactured on a waveguide chip.

According to another aspect, there is provided a telecommunication system comprising:

A transmitter for transmitting a telecommunication optical signal;

A receiver for receiving the telecommunication signal;

A optical fiber link for carrying the telecommunication optical signal and having a transmitter end optically coupled to the transmitter and a received end optically coupled to the receiver; and A dispersion compensator provided in a path of the telecommunication optical signal and comprising a dispersion compensating phase filter configured to compensate for chromatic dispersion accumulated by the telecommunication optical signal when travelling along the optical fiber link between the transmitter and the receiver.

In some implementations, the dispersion compensator is provided at the transmitter end of the optical fiber link.

In some implementations, the dispersion compensator is provided at the receiver end of the optical fiber link.

In some implementations, the telecommunication comprises a standalone dispersion compensation module including said dispersion compensator. The standalone dispersion compensation module may be in a Small Form-factor Pluggable (SFP) format. In some embodiments, the dispersion compensator comprises a waveguide Bragg grating (WBG), and the standalone dispersion compensation module further comprises side-by-side input and output ports and a circulator optically connecting the input port, output port and the WBG. The standalone dispersion compensation module may further comprise an optical amplifier provided between the input port and the circulator.

In some implementations, the dispersion compensator is integrated in a ROSA (Receiver Optical Sub-Assembly) package.

In some implementations, the dispersion compensator is integrated in a circuit platform.

Embodiments of the methods and filters presented herein may avoid the spectral phase accumulation of CWBGs, leading to a significant reduction of the device length.

Other features and advantages will be better understood upon reading of embodiments with reference to the appended drawings.

BRIEF DESCRIPTION OF THE DRAWINGS

FIG. 1 is a flow chart of a method of making a phase filter according to one implementation.

FIG. 12a Schematic diagram of a WBG with phase apodization; FIG. 12b illustrates the layout of a 0.9 cm-long spiral WBG; FIG. 12c shows the zoomed-in view of a curved portion near the center of the spiral

DETAILED DESCRIPTION

Figure 2:
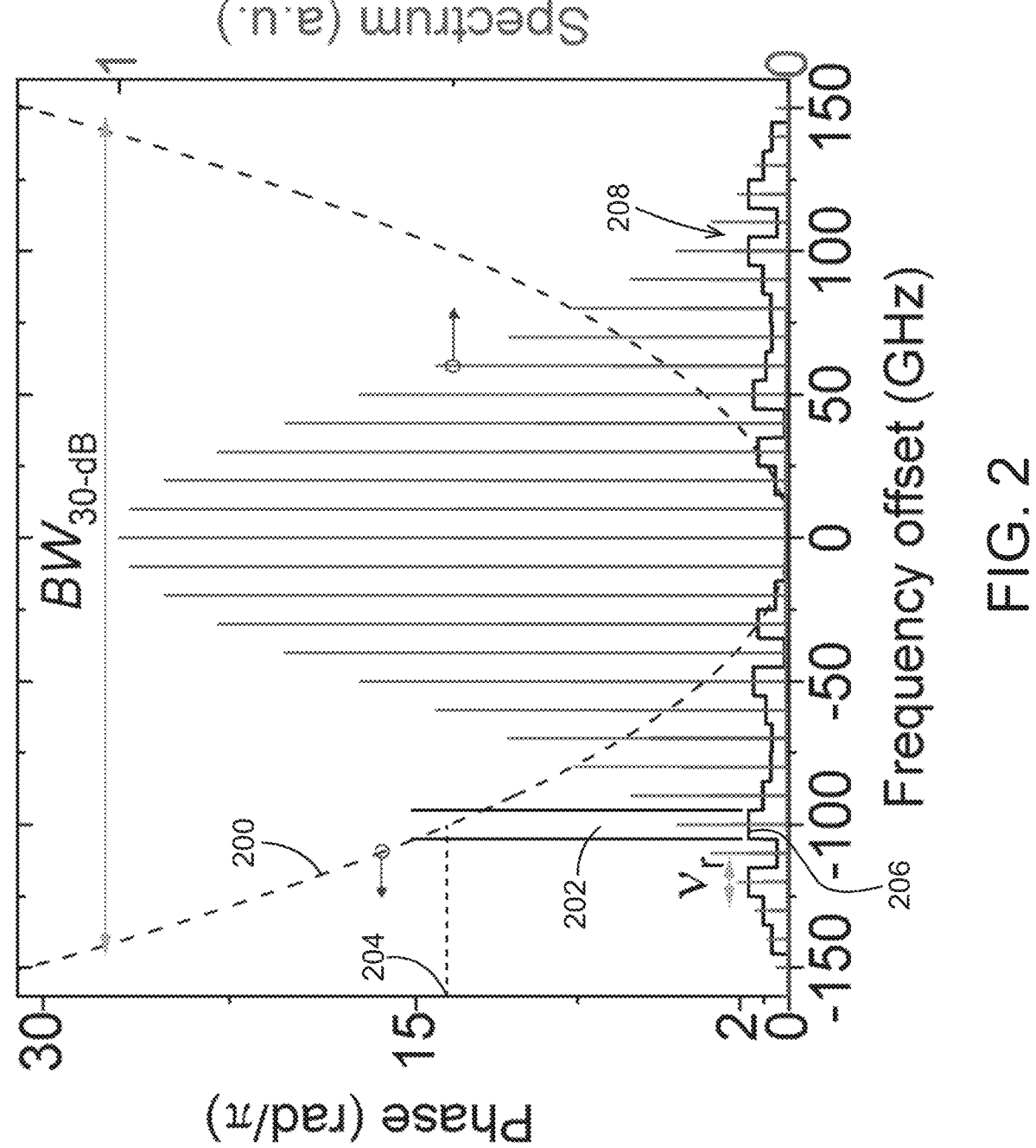
FIG. 2 graphically illustrates the discretizing of a phase profile of a dispersive line embodied by a continuous quadratic spectral phase variation of a second-order dispersive line applied to a periodic pulse train, and shows the input pulse spectrum, the continuous spectral phase and the corresponding $2\pi$-bounded discrete phase profile.
Figures 3A, 3B:
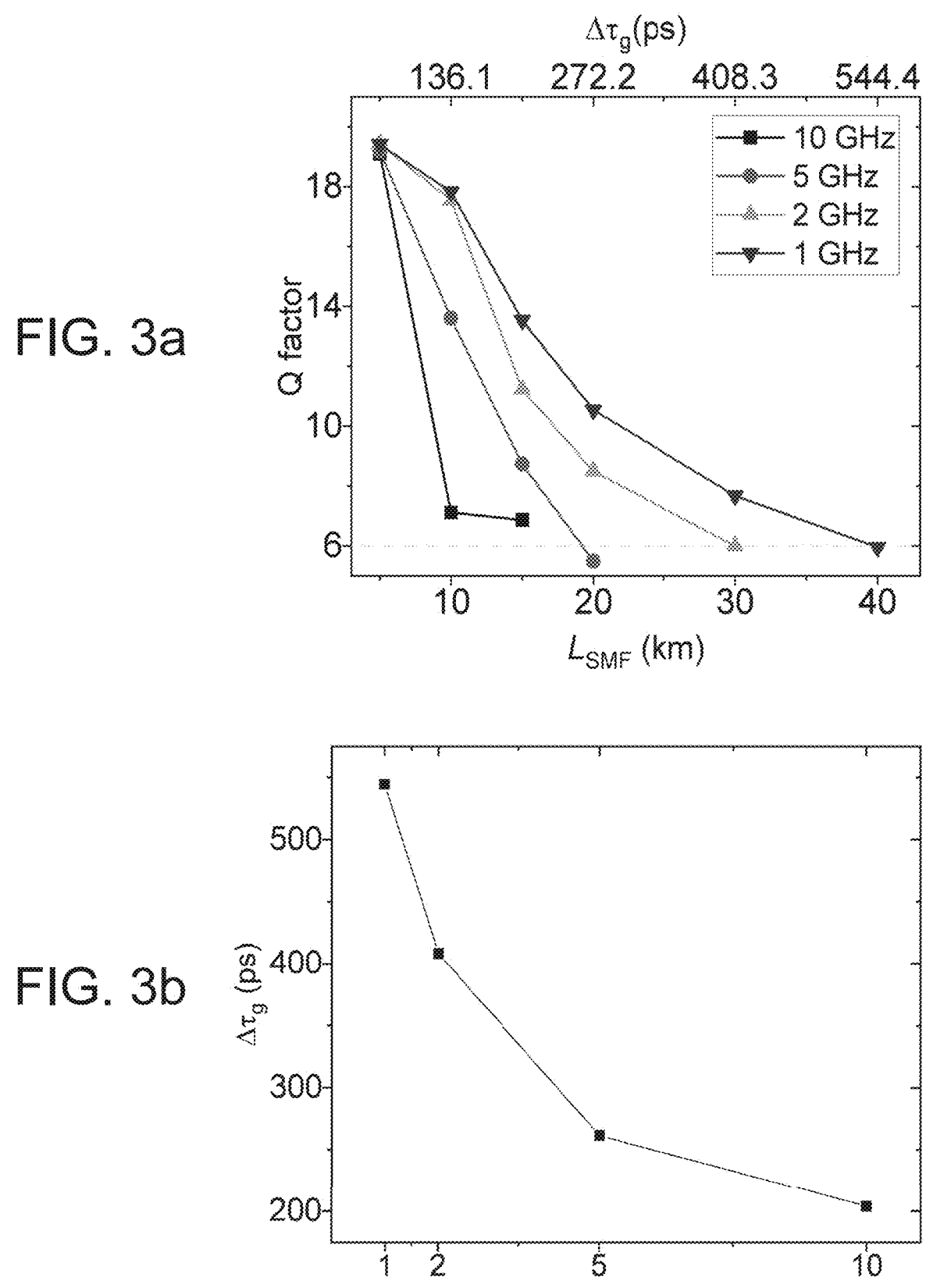
FIG. 3a shows the calculated Q-factor vs $L_{SMF}$ of a 50-Gbps, $2^{15}$-1-bit PRBS NRZ-OOK data signal after SOD compensation using discrete phase filters with varying $v_r$. The equivalent $\Delta\tau_g$ is noted in the top axis.
FIG. 3b shows the corresponding plot of $\Delta\tau_g$ for different $v_r$, for a fixed Q-factor of 6.
Figure 3C:
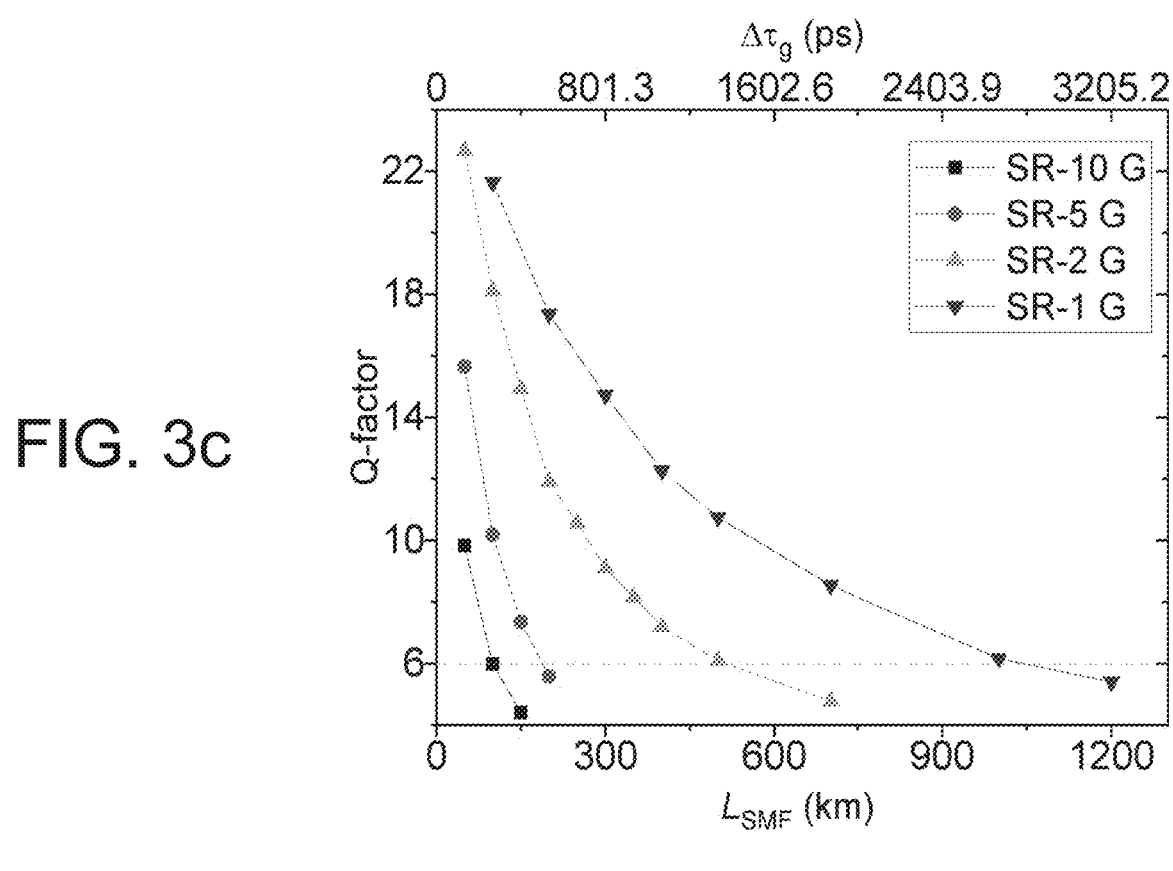
FIG. 3c shows the calculated Q-factor vs $L_{SMF}$ of an 80-Gbps, $2^{15}$-1-bit PRBS RZ-OOK data signal with 1-ps FWHM Gaussian pulses, after TOD and FOD compensation from discrete phase filters with varying $v_r$.
Figure 3D:
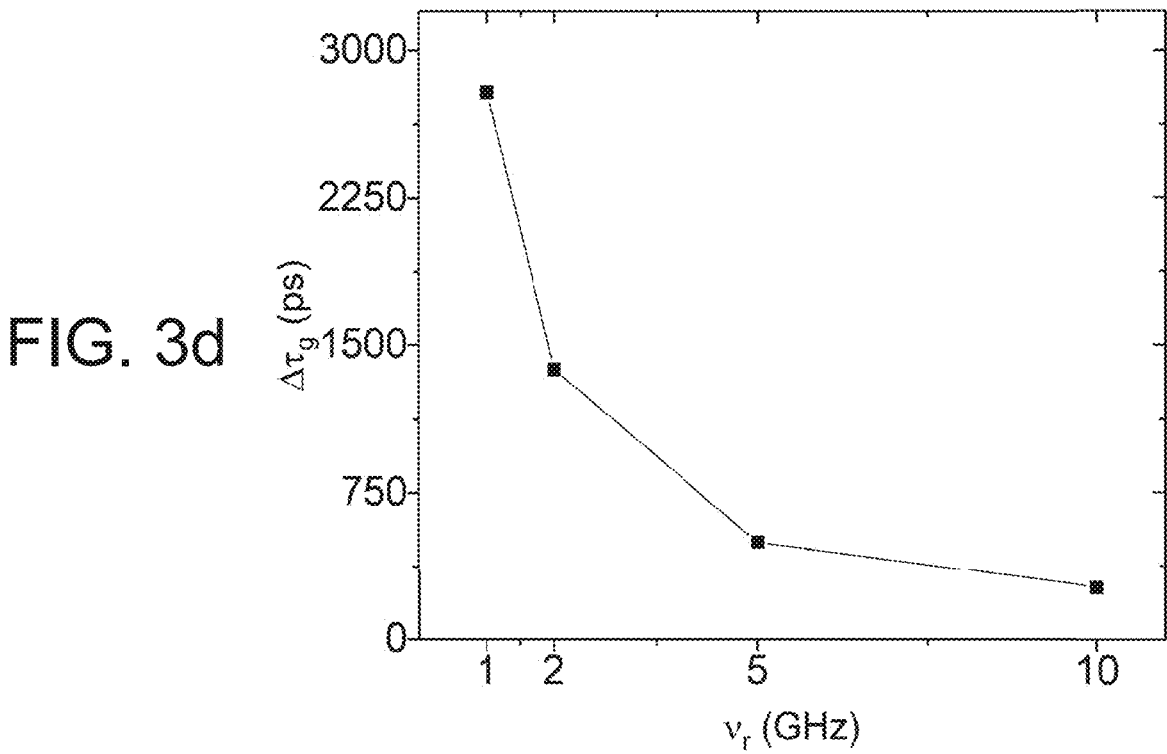
FIG. 3d shows the corresponding plot of $\Delta\tau_g$ for different $v_r$, for a fixed Q-factor of 6.

The present description generally concerns dispersion compensating phase filters for telecommunication optical signals accumulating chromatic dispersion when travelling in a dispersive line, as well as methods of making such phase filters.

As readily understood by one skilled in the art, telecommunication signals are typically embodied by light beams in which different wavelengths (typically evenly-spaced wavebands) are associated with different channels, each channel being modulated according to a bit pattern. The use of wavelength division multiplexing (WDM) allows for multiple optical data streams to be concurrently transmitted at different wavelengths through a single optical fiber. The phase filters described herein may be used in association with any given channel of a telecommunication optical signal, regardless of wavelength, bandwidth or modulation format. As know in the art, modulation formats for the wavelength channels include the return-to-zero (RZ) or the nonreturn-to-zero (NRZ) formats. In the RZ format, the data pulse width remains constant, whereas it varies depending on the bit pattern in the case of NRZ format. The NRZ format is commonly used in practice, as its associated bandwidth is smaller than the RZ format due to fewer on-off transitions. On-off keying (OOK) is the simplest modulation technique, wherein the power of the laser generating the light beam is simply switched between two levels (0 and 1). To improve the spectral efficiency of optical fiber links, modern lightwave systems employ advanced modulation techniques, such as quadrature phase shift keying (QPSK), pulse amplitude modulation (PAM), and quadrature amplitude modulation (QAM).

When travelling along optical communication lines such as optical fibers, telecommunication optical signals experience chromatic dispersion. One skilled in the art understands chromatic dispersion as the intra-channel or extra-channel variation in group delay experienced by different wavelengths travelling in a same line, as different wavelengths have slightly different group and phase velocities in the optical fiber medium. As such, telecommunication optical fibers are inherently dispersive lines. Compensating for chromatic dispersion therefore involves imposing a dispersion on the optical signal which is opposite to the one experienced through its propagation along the dispersive transmission line.

Method of Making a Phase Filter

Referring to FIG. 1, there is shown a flow chart of a method 100 of making a dispersion compensating filter for a telecommunication optical signal accumulating chromatic dispersion when travelling in a dispersive line.

As will be readily understood by one skilled in the art, telecommunication optical signals typically include a plurality of channels each associated with a given wavelength, or optical frequency, over a given bandwidth. For each channel, the telecommunication optical signal is characterised by an aperiodic waveform varying in a continuous manner over time.

Target Dispersion Compensating Phase Profile

The method 100 first includes determining 102 a target dispersion compensating phase profile of a channel of the telecommunication optical signal, that is, the spectral phase variation between the different wavelength components within the channel bandwidth that accumulates as the optical signal travels along the dispersive line. Spectral components of an optical signal acquire a z-dependent phase factor φ(ω) (z representing the light propagation direction) during propagation through an optical fiber, which is given by $$\phi(\omega) = \frac{\beta_2 L}{2}\omega^2 + \frac{\beta_3 L}{6}\omega^3 + \frac{\beta_4 L}{24}\omega^4 \tag{1}$$

Where ω is the baseband frequency variable, i.e., the relative frequency with respect to the optical frequency at the center of a given wavelength communication channel, $\beta_2$, $\beta_3$, and $\beta_4$ are the second-order dispersion (SOD), third-order dispersion (TOD), and fourth-order dispersion (FOD) coefficients, respectively. L is the propagation length along the z direction, that is, the distance travelled by the optical signal over which dispersion accumulates.

As discussed above, all-optical dispersion compensation techniques traditionally employ either specially designed fibers (e.g., DCFs) or optical fiber filters, such as FBGs, so as to cancel the acquired phase factor. For example, the condition for perfect SOD compensation over the full bandwidth of an optical signal channel can be simply written as $\beta_2 L + \beta_{21} L_1 = 0$, where $\beta_{21}$ is the SOD coefficient of the dispersion compensating medium (e.g., a DCF or an FBG), and $L_1$ is the required length. Similar equations can be written for TOD and FOD compensation as well.

Still referring to FIG. 1 and with additional reference to FIG. 2, in some implementations, in order to determine the target dispersion compensating phase profile, the phase profile 200 of the dispersive line is used as a starting point. Let us first target realization of a second-order dispersive line characterized by a SOD coefficient 32 and of length L, over a full frequency bandwidth $BW_{30\text{-}dB}$. By way of example only, FIG. 2 shows a phase profile 200 embodied by a continuous quadratic spectral phase function of such a second-order dispersive line. It will be readily understood that a quadratic function is shown here for illustrative purposes only and that the present method may be applied to arbitrary phase profiles. The method 100 involves discretizing 104 the phase profile 200 of the dispersive line into a plurality of frequency sub-bands 202 over the bandwidth $BW_{30\text{-}dB}$ of the channel. Each frequency sub-band 202 covers a fraction of the full bandwidth $BW_{30\text{-}dB}$ of the channel, and adjacent frequency sub-bands 202 are coterminous such that all of the frequency sub-bands 202 together continuously cover the entire bandwidth of the optical signal. In the illustrate embodiment and following discussion, the frequency sub-bands 202 all have the same width along the frequency domain, but it will be understood that in other variants, steps of varying widths may be considered without departing from the scope of protection. As explained further below, each frequency sub-band having a width $v_r$ is selected in view of compensating the chromatic dispersion imposed by the dispersive line. The limits of the manufacturing technology which will be used to make the filter can also be a consideration influencing the selection of the width of the frequency sub-bands. By way of example, in some implementations the maximum size of the frequency sub-bands could be dictated by the target GVD to be compensated (e.g. SMF length) for a given channel bandwidth, whereas the minimum size of the frequency sub-bands may be set by the manufacturing technology platform of choice.

For each of said frequency sub-bands 202, the method 100 next includes computing 106 an average phase value of the phase profile of the dispersive line 200. One skilled in the art will understand that the term "average" in this context refers broadly to a single value that summarizes or represents the general significance of a set of unequal values. In some example, the average phase values 204 may be chosen as the phase at the center of the frequency sub-band. In other variants, different averaging functions may be used. As will be readily understood by one skilled in the art, the average phase value 204 associated with each frequency sub-band 202 may be expressed as a multiple of r. For example, in the implementation shown on FIG. 2, the quadratic phase profile of the dispersive live varies between 0 and $30\pi$. The method then involves converting 108 each average phase value to an equivalent $2\pi$-bound phase value 206 for each frequency sub-band 202. Mathematically, in some implementations this can be expressed as computing a modulo $2\pi$ function of the average phase value 204, that is, taking the remainder of the division of the average phase value by $2\pi$. As will be readily understood, the resulting phase value will be equal to or less than $2\pi$. The method next involves building 110 the target dispersion compensating phase profile 208 as the equivalent $2\pi$-bound phase value 206 over each frequency sub-band 202.

In the example illustrated in FIG. 2, a second-order dispersive line characterized by a SOD coefficient $\beta_2$ and of length L, over full frequency bandwidth $BW_{30\text{-}dB}$ is considered, with a frequency sub-band of $\omega_r = 2\pi v_r$. The target dispersion compensating phase profile 208 can be considered as effectively emulating the continuous spectral phase profile 200 of the target dispersive line, i.e. $\phi(\omega) = (\beta_2 L/2)\omega^2$ as long as this phase profile 200 remains approximately constant over the width $v_r$ of the frequency sub-bands. This condition can be expressed mathematically as $$\Delta\phi(\omega) \approx \beta_2 L \omega_r \omega \ll \pi \tag{2}$$

The inequality (2) should be satisfied over the full operation bandwidth, which translates into the following condition $$2\pi\beta_2 L\omega_r BW_{30\text{-}dB} = \Delta\tau_g\omega_r \ll 2\pi \tag{3}$$

Or, $$\Delta\tau_g v_r \ll 1 \tag{4}$$

where $\Delta\tau_g = 2\pi\cdot\beta_2\cdot L\cdot BW_{30\text{-}dB}$ is the net group-delay excursion of the target dispersive line. Eqn. (4) implies that the maximum group-delay excursion that can be emulated with the proposed discrete phase filtering approach is inversely proportional to the width of the frequency sub-bands. These considerations can be used in selecting the width of the frequency sub-bands in view of a target implementation. Hence, in some embodiments the discretizing of the phase profile may involve selecting the width of each frequency sub-bands such that said width provides a target net group delay excursion of the dispersive line, in view of a target performance factor for a pre-set length and phase profile of the dispersive line. A given width of the frequency sub-band of the phase filter dictates the amount of group delay excursion that can be compensated for and is a figure of merit for a discrete phase filter. Referring to FIGS. 3a to 3d, system-level simulations (i.e., Q-factor and BER estimates) of discrete phase filters designs with varying frequency sub-band widths $v_r$, aimed at compensation of arbitrary GVD of SMF with different lengths have been carried out. First, SOD compensation of a $2^{15}$-1-bit pseudo-random bit sequence (PRBS) 50-Gbps NRZ-OOK data signal is considered. The calculated Q-factor of the output signal after compensation from respective phase filter is plotted for different SMF lengths ($L_{SMF}$) in FIG. 3a. As expected, for a given Q-factor, phase filter designs with smaller frequency sub-band widths can compensate for larger $\Delta\tau_g$. For a Q-factor of 6 (BER~$10^{-9}$, denoted with a dotted grey line), the corresponding $\Delta\tau_g$ is plotted versus $v_r$, in FIG. 3b. For an output BER~$10^{-9}$, a discrete phase filter design with $v_r = 10$ GHz can compensate for a 16 km long segment of a standard SMF ($\Delta\tau_g$ $v_r$~2.2), compared to up to 40 km, in the case of a phase filter with $v_r = 1$ GHZ. As observed in FIG. 3b, the aforementioned relation in Eqn. 4 is far too restrictive, and can be sufficiently relaxed depending on the sensitivity of the receiver. It is to be noted that discrete phase filters based on the proposed method require longer device length (typically, ≥1 cm) to realize a narrower frequency sub-band width ($v_r$≤5 GHZ). The present analysis has been restricted to designs with device lengths≤1 cm. This would ensure that the resulting designs are practically feasible for fabrication using available technologies, e.g., in a SOI platform. In general, it may be challenging to maintain coherence in the grating fabrication process over longer device lengths, which ultimately translates to additional losses and undesired distortions in the spectral response.

Figure 4A:
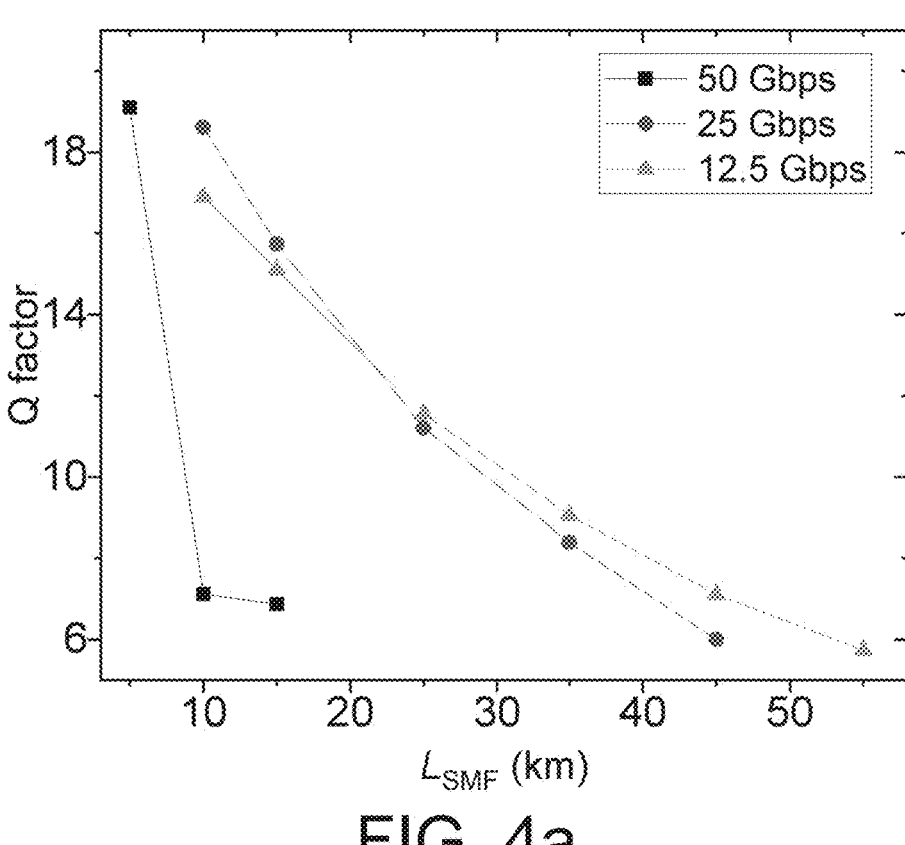
FIGS. 4a and 4B illustrate the variation of Q-factor vs $L_{SMF}$ after SOD compensation of an NRZ-OOK signal with different bit rates (FIG. 4a) and after TOD and FOD compensation of an 80 Gbps RZ-OOK signal with varying FWHM of the Gaussian pulses, using a discrete phase filter with $v_r$=10 GHz (FIG. 4b).
Figure 4B:
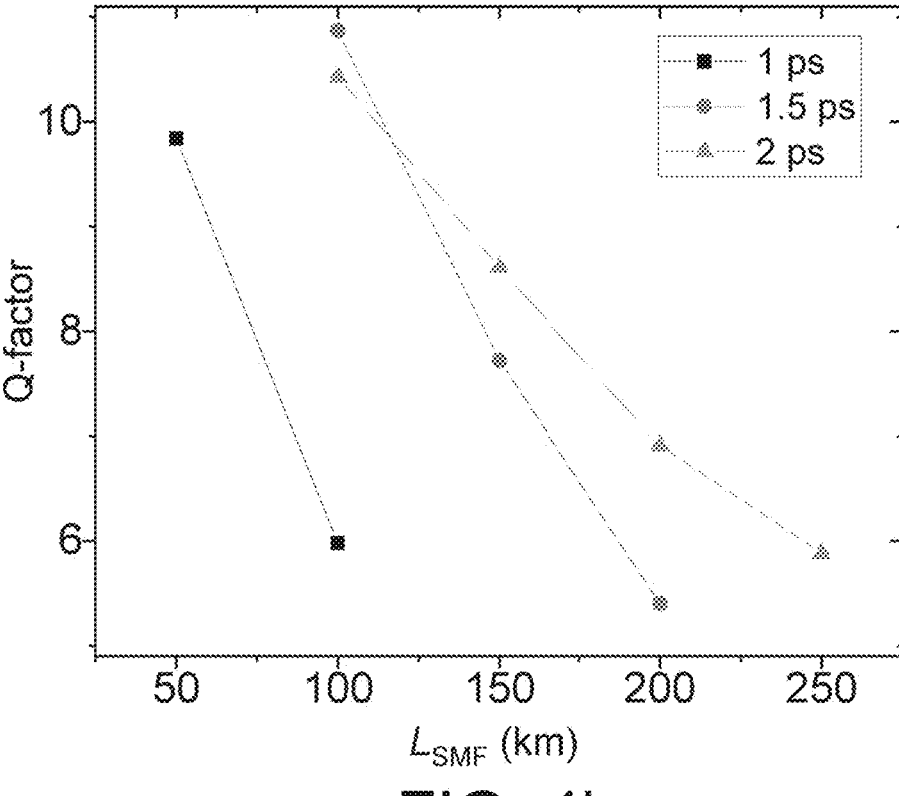

Similar analysis were conducted for more complex modulation formats as well, such as the PAM-4 signal. Specifically, a $2^{15}$-1-bit PRBS 50-Gbaud/s PAM-4 signal was considered. It was observed that a discrete phase filter with $v_r$ of 10 GHz can provide compensation for up to 9 km of standard SMF. PAM-4 consists of four distinct signal levels and thus, it suffers from a higher optical signal to noise ratio (OSNR) penalty compared to NRZ-OOK signal. Next, the potential of the proposed discrete phase filtering solution was analysed for TOD and FOD compensation of a RZ-OOK data stream (see FIG. 3(c, d)). For this exercise, the SOD coefficient of the standard SMF is assumed to be zero. Particularly, a $2^{15}$-1-bit PRBS 80-Gbps RZ-OOK data signal, with 1-ps intensity full-width at half-maximum (FWHM) Gaussian pulses is considered. For an output Q-factor of 6, it was observed that a phase filter with $v_r$=10 GHz can compensate for the TOD and FOD, equivalent to 100 km of standard SMF. On the other hand, a phase filter with $v_r$=1 GHz can compensate for a 1000 km long section of fiber. This confirms the inverse relationship that exists between $v_r$ and $\Delta\tau_g$, consistently with the above theoretical predictions. Furthermore, as observed in FIG. 4(a, b), for both NRZ (RZ) formats, the performance of a phase filter design, with a fixed $v_r$=10 GHz, improves proportionally with a reduction in the input bit rate (FWHM) for varying values of $L_{SMF}$.

Physical Implementation of the Phase Filter

Referring back to FIG. 1, the method 100 next involves a step of determining 112 spatial parameters of a spectral filtering structure having a spectral filtering profile substantially corresponding to the target dispersion compensating profile, and manufacturing 114 this spectral filtering structure. In accordance with one aspect, there is provided a dispersion compensating filter resulting from this manufacturing.

In some implementations, the spectral filtering structure may be a waveguide Bragg grating (WBG) manufactured on a waveguide chip. In some implementations the WBG may be designed for use in reflection, such that the associated spectral filtering profile is the grating reflectivity profile. In other implementations, the WBG may be designed for use in transmission. Advantageously, WBGs offer a compact structure and their design and manufacturing based on a desired reflectivity profile is well known in the art. It will however be readily understood that other types of on-chip spectral filtering structures may be used, such as for example concatenated micro-elements such as micro-resonators, micro-rings and the like. It will however be understood that implementations of the present method and filters are not limited to on-chip implementations. For example, other embodiments may take the form of Fiber Bragg gratings (FBGs) or other fiber structures.

Figures 5A, 5B:
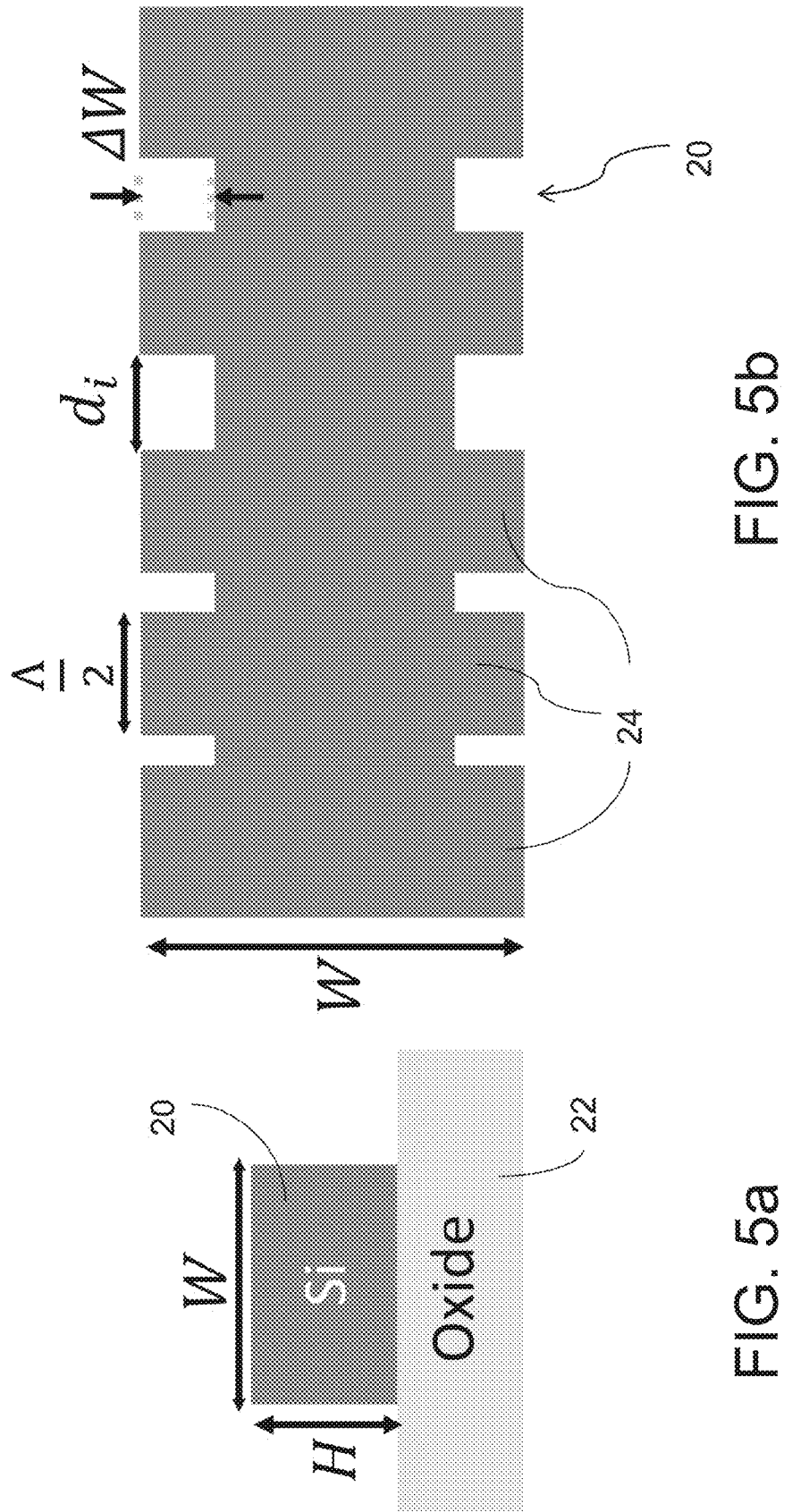
FIGS. 5a and 5b are respectively schematic side (a) and top (b) views of a phase-modulated WBG according to one embodiment.

Referring to FIGS. 5a and 5b, an example of a WBG 20 embodying an example of a on-chip spectral filtering structure is schematically illustrated. The WBG 20 may be made of silicon and extend over an oxide substrate 22. The WBG 20 has a height H over the substrate 22 and an overall width W. Along the light propagation direction z, the WBG 20 defines a plurality of corrugations 24 each having a length corresponding to half the grating period A, a depth AW and a variable spacing $d_i$. As know by one skilled in the art, the spatial parameters H, W, $\Lambda$, $\Delta W$, $d_i$ can be selected so as to tailor the spectral filtering profile of the resulting structure.

Figure 6:
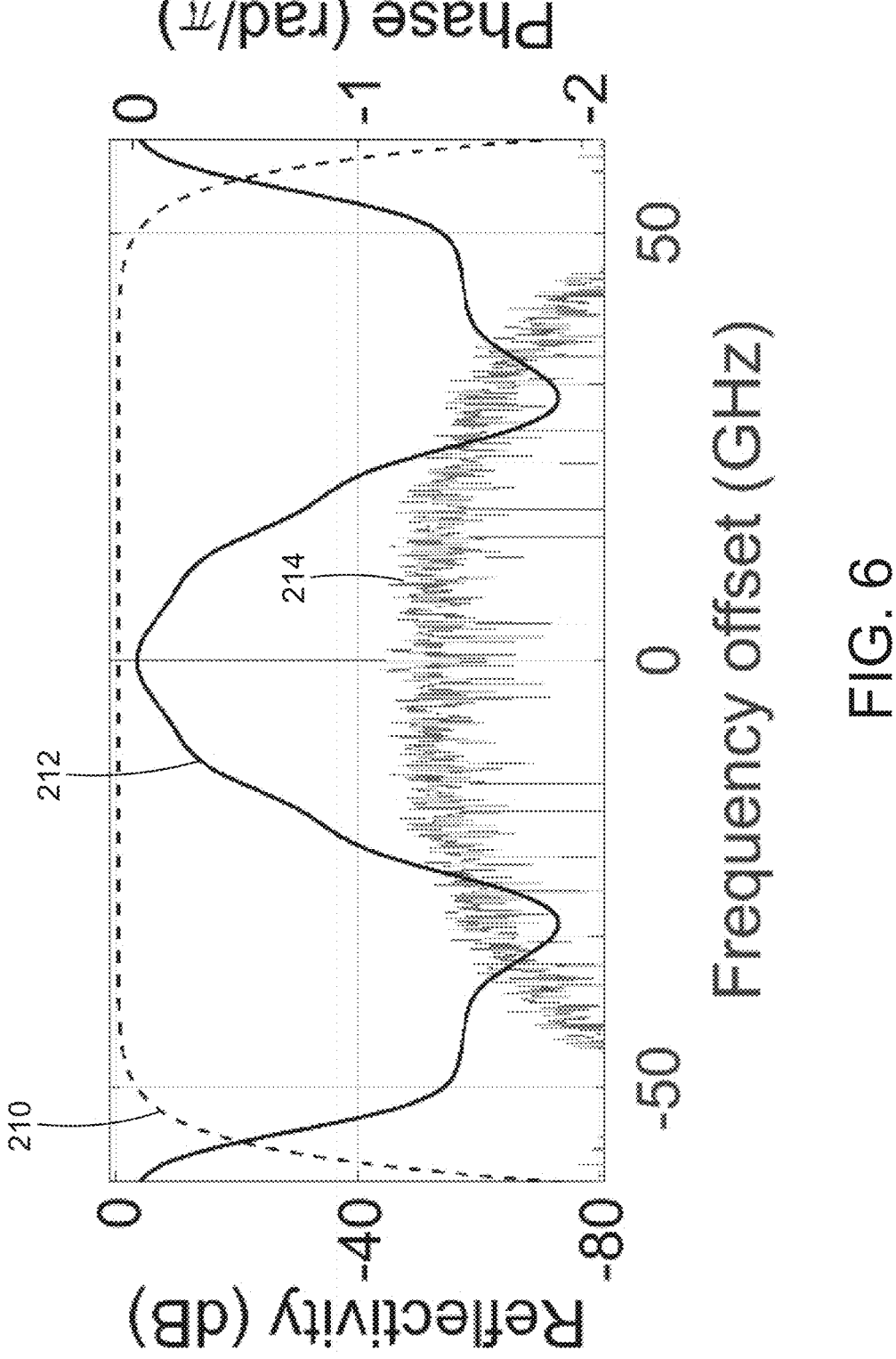
FIG. 6 illustrates the spectrum of an input 50-Gbps NRZ-OOK data signal, an example of target reflectivity, and the corresponding spectral phase profile of a WBG.

To illustrate the design framework, an on-chip phase filter design with $v_r$=10 GHZ, aimed at achieving SOD compensation of a 50-Gbps NRZ data signal after propagation through 16 km of SMF, is considered. Let us define the target complex spectral reflectivity response $H(j\omega)$ of the on-chip discrete phase filter, which can be represented by:

$$H(j\omega) = |H(j\omega)| \angle H(j\omega) = \frac{Y(j\omega)}{X(j\omega)} \qquad (5)$$

Where $|H(j\omega)|$ is the amplitude of the spectral reflectivity response, $\angle H(j\omega)$ is the phase profile of the reflectivity response (i.e. the spectral filtering phase profile), and $X(j\omega)$ and $Y(j\omega)$ denote the complex spectrum of the input and output signal, respectively. As shown on FIG. 6, by way of example the target amplitude 210 of the spectral reflectivity response of the phase filter is assumed to be an 8th-order super Gaussian function with peak intensity ($|H(j\omega)|^2$) of 0.9 and 3-dB BW of 100 GHz. The spectral filtering phase profile ($\angle H(j\omega)$) is set as substantially corresponding to the target dispersion compensating profile. One skilled in the art will readily understand that the spectral filtering phase profile substantially corresponds to the target dispersion compensating profile which differences between the two do not affect the performance of a resulting device beyond acceptable levels for the application to which this device is destined. The optical spectrum 214 of the telecommunication optical signal, here a $2^{15}$-1-bit long PRBS NRZ-OOK signal is also depicted on the same plot to illustrate with discrete spectral phase filtering operation.

Figure 7:
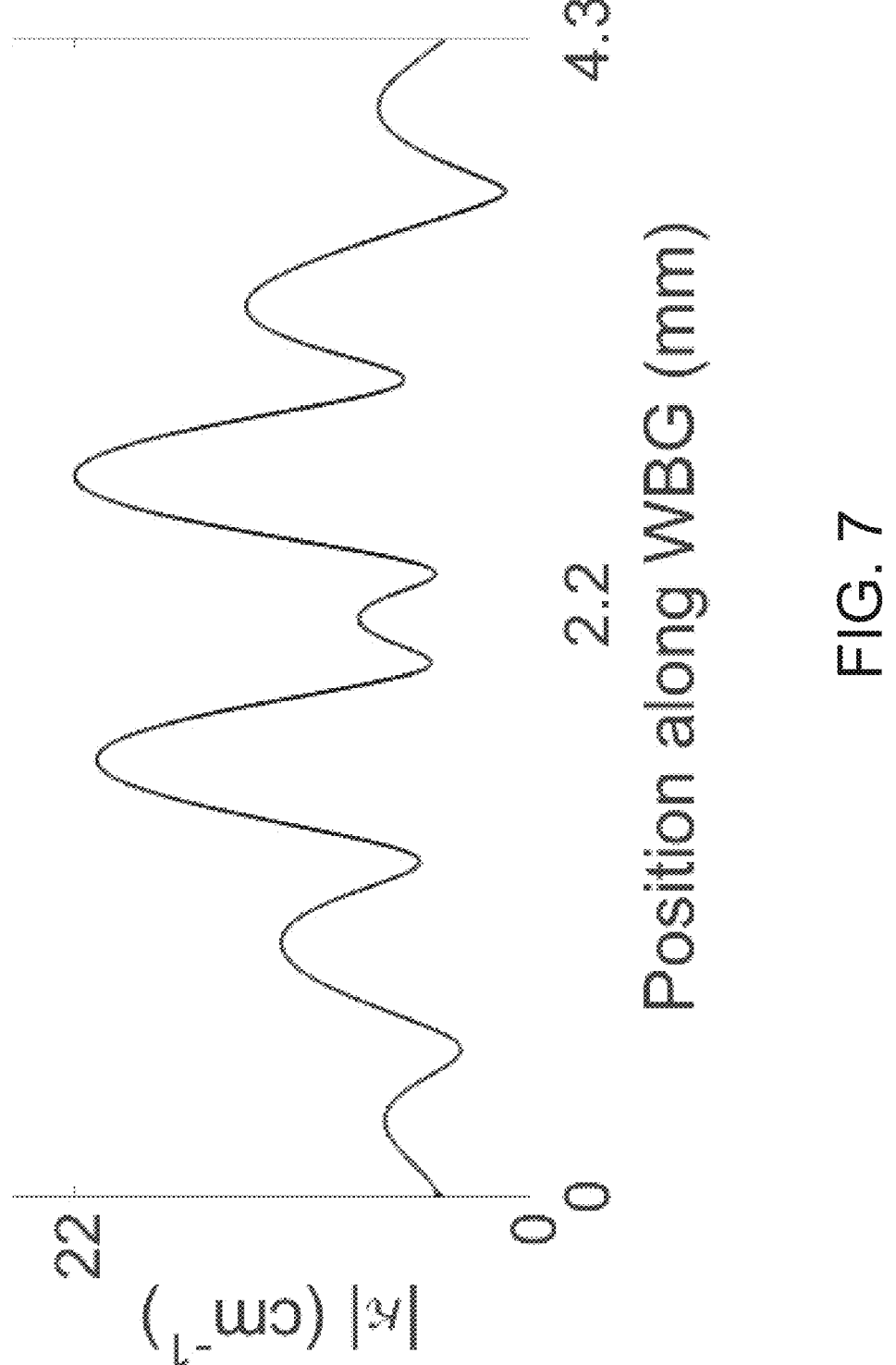
FIG. 7 illustrates an exemplary coupling coefficient (K) profile extracted from an inverse layer peeling algorithm.

As know in the art, a spectral transfer function can be used to determine the spatial parameters of an integrated WBG structure having a desired reflectivity profile. In some implementations, an inverse layer peeling algorithm may be used to calculate the WBG coupling coefficient ($\kappa$) profile required to achieve such a response and is shown in FIG. 7. A high dynamic range and precise control of the coupling coefficient may be useful for successful realization of the target spectral response. In some implementations, a phase-modulated grating structure can be designed to provide the desired spectral transfer function. Briefly, the target apodization is achieved by incorporating a slowly varying sinusoidal phase component in the phase profile of the WBG, denoted as the phase apodization function $\phi_{AP}(z)$ in Eqn. 6 below. Specifically, the effective index profile of the WBG, $n(\lambda, z)$ as a function of wavelength $\lambda$ and device length z can be expressed as follows:

$$n(\lambda, z) = n_{eff}(\lambda) + \Delta n \cdot \cos\left\{\frac{2\pi}{\Lambda}z + \phi_k(z) + \phi_{AP}(z)\right\} \qquad (6)$$

where $\Delta n$ is the constant grating strength, $\Lambda$ is the nominal grating period, $\phi_k(z)$ is the grating phase and $$\phi_{AP}(z) = \phi_0(z) \cdot \sin\left(\frac{2\pi}{\Lambda_P}z\right)$$

is the apodization phase function having a slowly modulating amplitude $\phi_0(z)$ and a phase period $\Lambda p$. $\phi_0(z)$ is mapped to the normalized target coupling coefficient profile, $$f(z) = \frac{|\kappa(z)|}{\kappa_{max}},$$

by a $0^{th}$-order Bessel function namely, $$\phi_0(z) = J_0^{-1}(f(z)).$$

Figures 8, 8A:
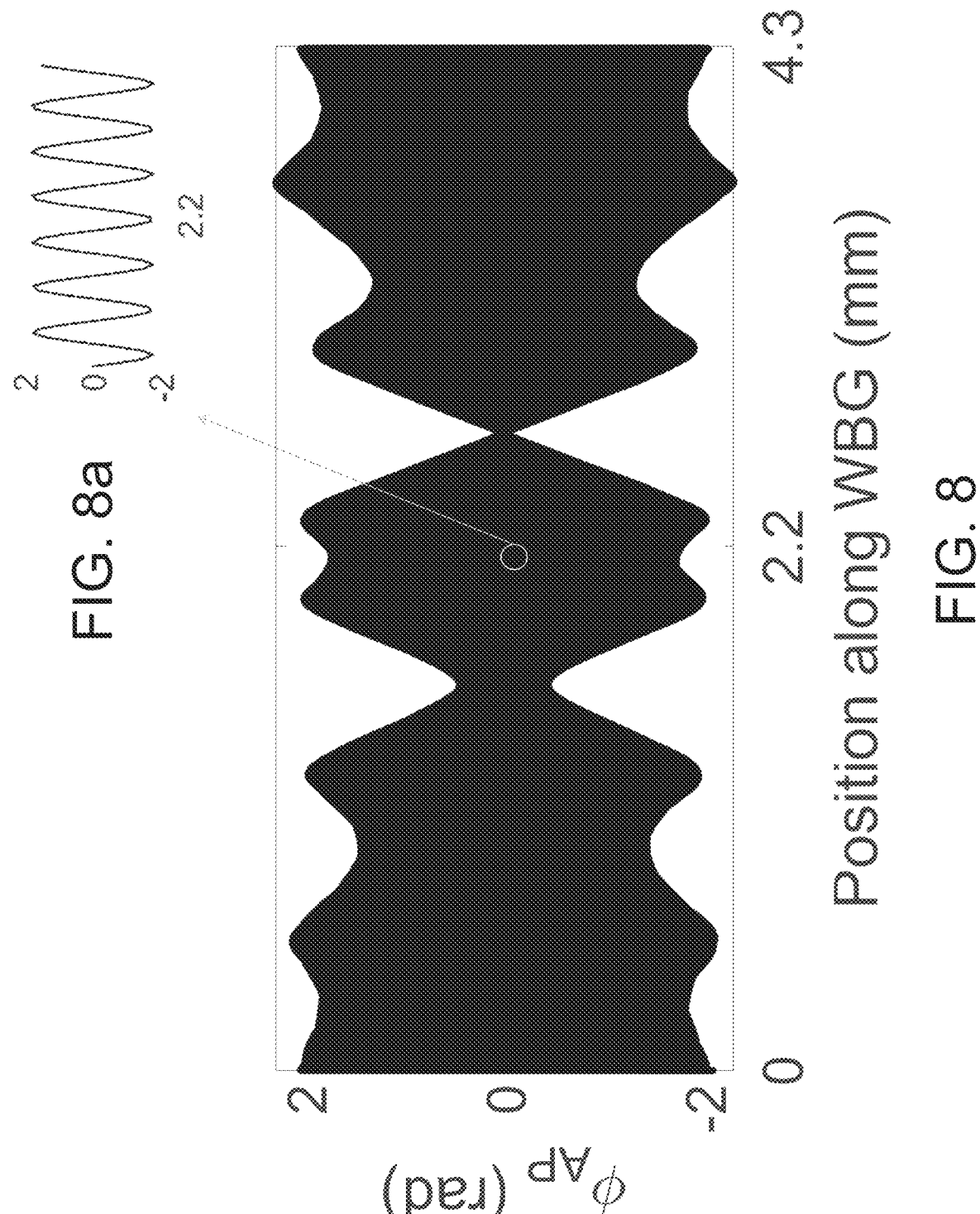
FIG. 8 illustrates the variation of $\phi_{AP}$ along the length of a WBG's length.
FIG. 8a shows a zoom of the sinusoidal variation.
Figure 9:
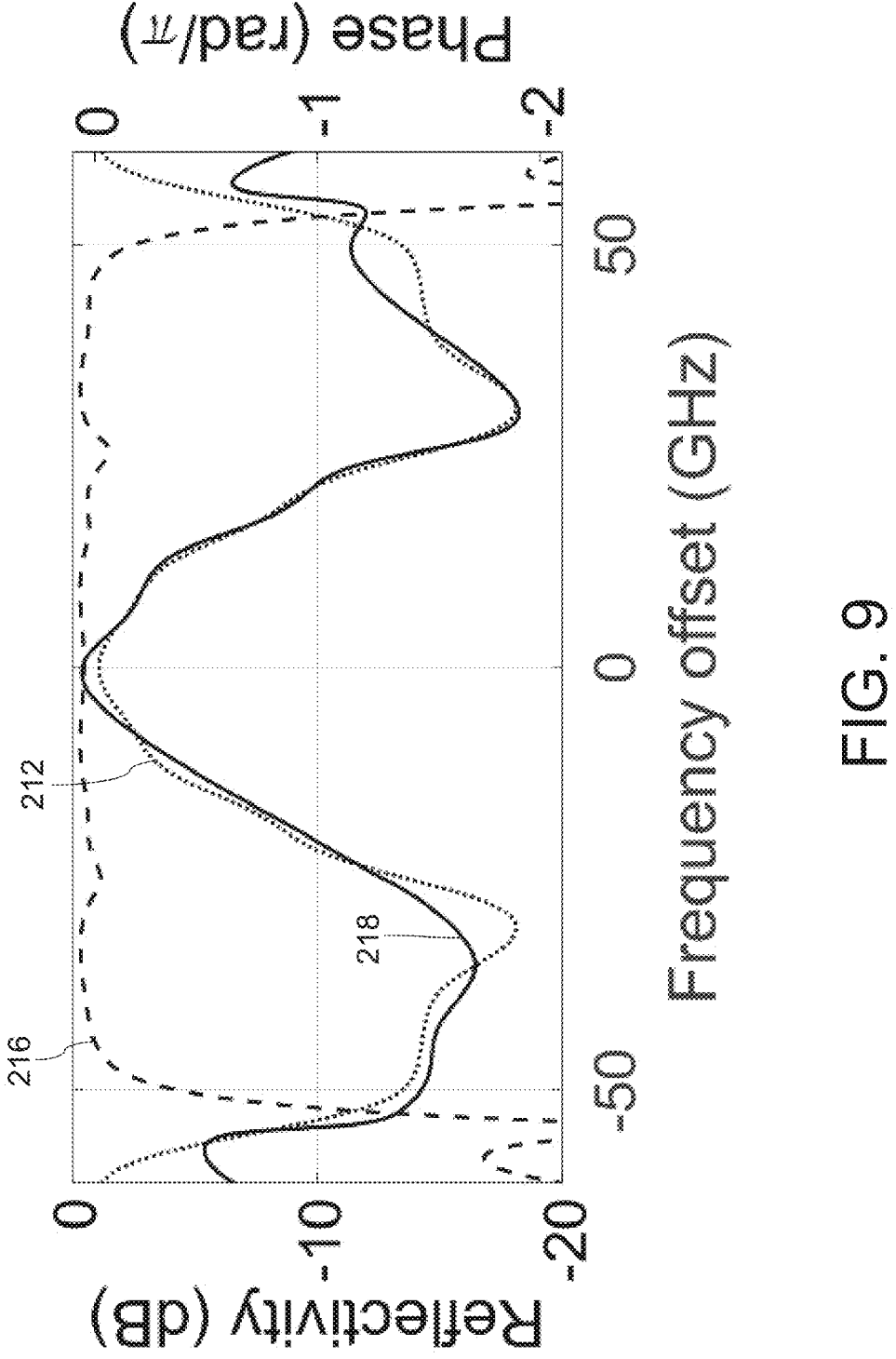
FIG. 9 illustrates the calculated reflectivity and associated spectral phase response of a phase-modulated WBG.

In this design, $\Lambda_P$ is fixed at 3 µm. FIG. 8 shows the variation of ϕAP(z) along the WBG. In this embodiment, a modulation of the distance between consecutive corrugations along the WBG is used as the spatial parameter providing the desired spectral filtering phase profile. The grating phase components $\phi_0(z)$ and $\phi_{AP}(z)$ can therefore be physically implemented by modulating the distances ($d_i$) between the $i^{th}$ and $(i+1)^{th}$ corrugation along the WBG. A 2 µm wide (W)×220 nm thick (H) multimode waveguide can be chosen to implement the phase filters, owing to their lower sensitivity to phase noise and sidewall roughness. By way of example, A may be designed to be 278 nm for a 1550-nm center wavelength operation, with a corrugation depth (ΔW) set to 100 nm. The transverse-electric (TE) polarization is considered and the effective index $n_{eff}$ of the fundamental TE mode is calculated to be 2.804. A transfer matrix method was used to calculate the resultant WBG's complex spectral response. FIG. 9 shows the reflectivity 216 and phase response 218 of the designed WBG, in good agreement with the target response 212.

It will be readily understood that in other variants, different spatial parameters of the WBG may be varied to provide the desired spectral filtering phase profile. By way of example, in some implementations the corrugation depth (ΔW) may be used for this purpose. Previously demonstrated methods to implement apodization of the coupling coefficient in SOI WBG, include corrugation width modulation, duty cycle modulation, cladding modulation, and lateral misalignment modulation.

Figure 10:
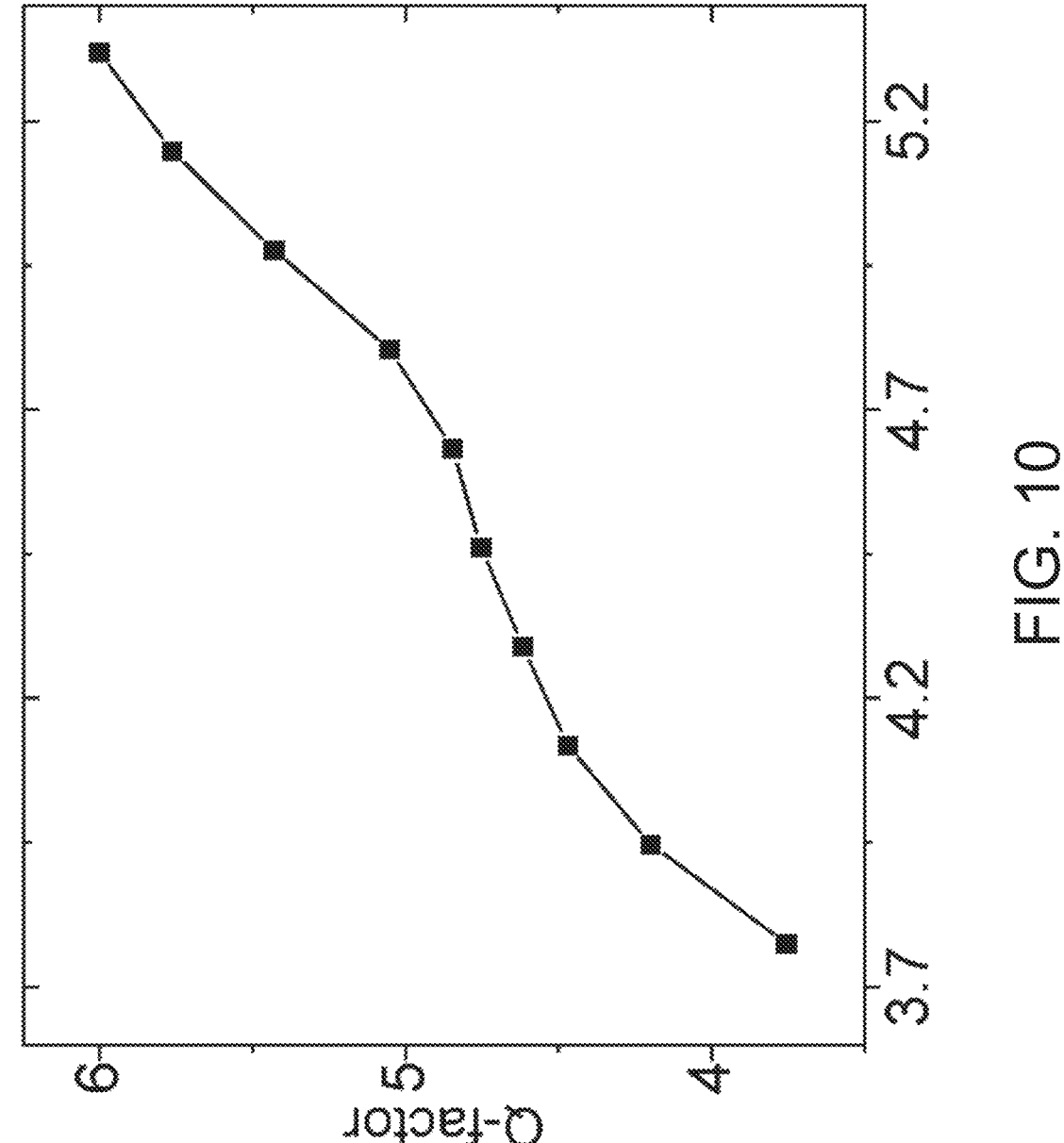
FIG. 10 illustrates the variation of the Q-factor of the output-compensated data signal for different device lengths of a phase filter according to one implementation.

In one example of realisation of an on-chip discrete phase filter as above, we truncate the κ(z) profile at different lengths and evaluate the corresponding spectral phase profiles. Subsequently, we calculate the Q-factor of the output signal after reflection from each of the evaluated phase filter profiles. The calculated Q-factor is plotted for different device lengths in FIG. 10. Generally, longer device lengths can approach more closely the target spectral phase profile, leading to improved performance (higher Q-factor). In one implementation we have selected a device length of 4.3 mm, as a good trade-off between compactness and performance. By comparison, for the same design parameters (namely net SOD and BW), a LCWBG requires to be at least ~8.6 mm long (2× longer device length). The LCWBG's device length is calculated using the following relationship:

$$L_G = \frac{c}{2n_g}\Delta\tau_g,$$

where c is the speed of light in vacuum, $n_g$ is the group index of the waveguide, and $\Delta\tau_g$ is the net group delay excursion over the full BW ($BW_{30\text{-}dB}$) of the input signal, calculated as $\Delta\tau_g = 2\pi\cdot\beta_2\cdot L_{SMF}\cdot BW_{30\text{-}dB}$. It is of note that this estimate is overly optimistic, as it does not consider the additional device length required for suitable apodization to reduce the group delay ripple (GDR) in the passband response of the LCWBG such that the grating can be utilized for the intended application.

Multichannel WBG-Based Discrete Phase Filter Design for Dispersion Compensation

In some implementations, a dispersion compensation filter according to the present description may be designed and made to compensate for the accumulated chromatic dispersion of multiple channels of a telecommunication optical signal travelling in a dispersive line.

By way of example, the effective index profile of a WBG or FBG modulated with the phase apodization function $\phi_{AP}(z)$ can be extended to a multichannel application by introducing a periodic phase-only sampling function, $\phi_m$, with a period, $\Lambda_m$, in Eqn. (6), leading to:

$$n(\lambda, z) = n_{eff}(\lambda) + \Delta n \cdot \cos\left(\frac{2\pi}{\Lambda}z + \phi_\kappa(z) + \phi_{AP}(z) + \phi_m(z)\right) \quad (7)$$

Figure 11A:
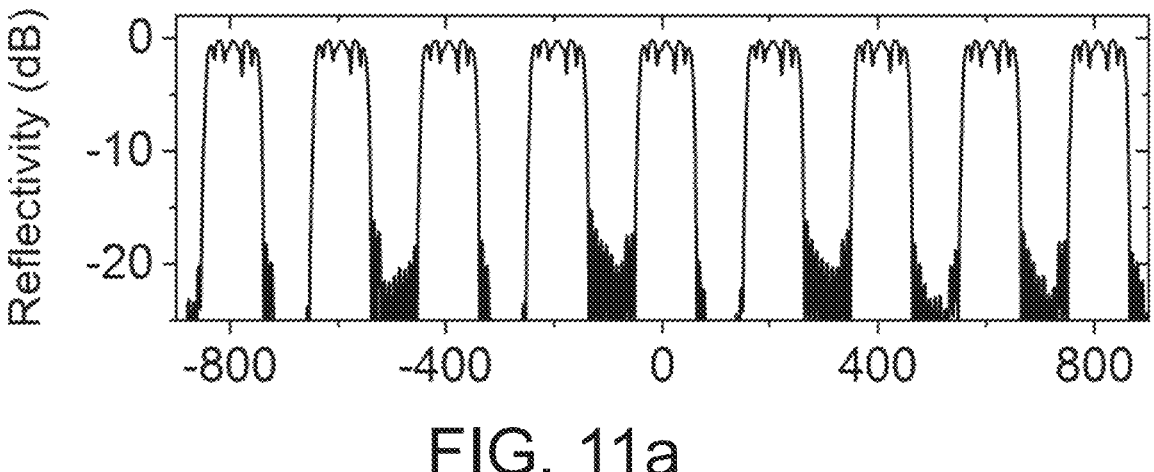
FIGS. 11a and 11b respectively illustrate the amplitude response (FIG. 11a) and phase response (FIG. 11b) of a WBG-based phase filter designed for dispersion compensation of nine successive WDM channels, spaced 200 GHz apart in a 31.12-km fibre-optic link, using a multilevel phase-only sampling function.
Figure 11B:
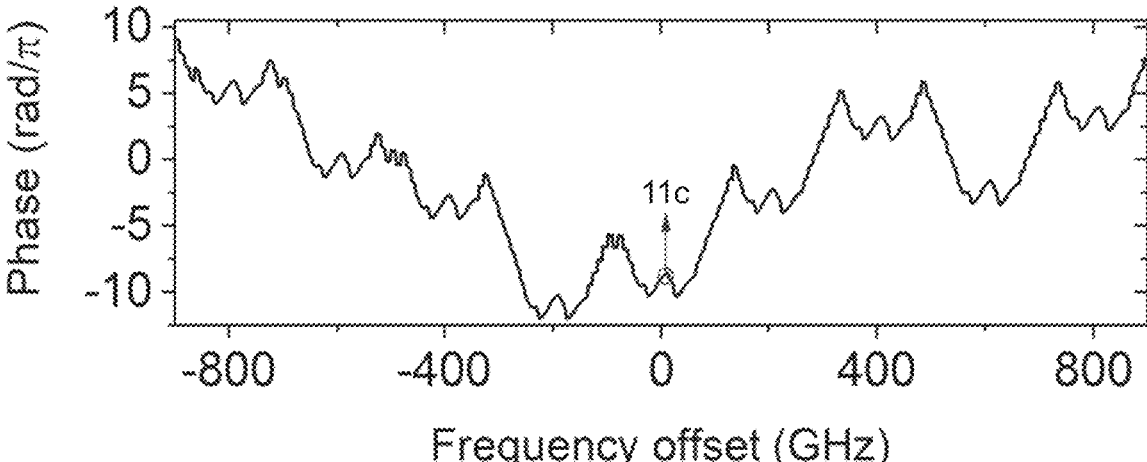
Figure 11C:
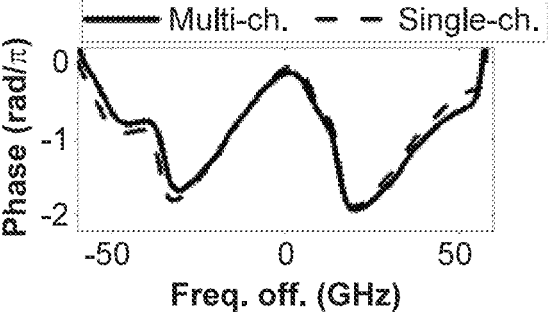
FIG. 11c shows the phase response across the passband of the central channel compared with the simulated response of the single-channel WBG (dashed).

Where, as a reminder, $n_{eff}$ is the effective refractive index of the waveguide, Δn is the constant grating strength, Λ is the nominal grating period, and $\phi_\kappa(z)$ is the grating phase. Such a phase sampling approach can be used to replicate the response of the single-channel WBG to successive WDM channels, with a given spacing (see H. Li, Y. Sheng, Y. Li, and J. E. Rothenberg, "Phased-only Sampled Fiber Bragg Gratings for High-channel-count Chromatic Dispersion Compensation," J. Light. Technol. 21, 2074 (2003), the entire contents of which is integrated herein by reference). The sampling function Øm may be optimized using a Simulated Annealing algorithm to ensure excellent uniformity and out-of-band rejection across different channels. Using this methodology, In some embodiments multichannel operation can be extended to more than 45 WDM channels. For example, FIGS. 11b and 11b, illustrate, through numerical simulations, a phase-sampled WBG-based phase filter design for dispersion compensation of nine WDM channels with a spacing of 200 GHz in a 31.12-km fibre-optic link, in which the excellent uniformity and out-of-band rejection of different WDM channels can be observed by one skilled in the art. The spectral phase response of the individual WDM channels is in excellent agreement with the single-channel WBG's phase response (see inset of FIG. 11b). A channel spacing of 200 GHz (1.6 nm) corresponds to $\Lambda_m$~200 µm, at $\lambda_0$~1550 nm. It is worth noting that $\Lambda_m$ is around two orders of magnitude higher compared to the period of the phase apodization function, $\phi_{AP}$. As the overall phase component, $(\phi_\kappa(z) + \phi_{AP}(z) + \phi_m(z))$, is physically implemented by modulating the distances between successive corrugations, this indicates that the implementation complexity of the resultant WBG structure, defined in terms of the required minimum feature size or the spatial resolution, is identical to that of the single-channel WBG. Further, for a target peak reflectivity, the required coupling coefficient peak value ($\kappa_{peak,\ m}$) of the N-channel phase-sampled WBG is $\sqrt{N/\eta}$ times that of the single-channel WBG, where η is the diffraction efficiency. In the example of the 9-channel phase-sampled WBG of FIGS. 11a and 11b, η~96%, hence the required $\kappa_{peak,\ m}$ is around three times higher than that of the single-channel WBG. Using this technique, the operational range of the proposed phase filter can be extended to the entire C and L telecommunication bands, thus potentially enabling Tb/s-capacity in medium-reach optical fiber links using a mm-long on-chip device.

Spiral Bragg Gratings Based on Multimode SOI Waveguides

Figures 12A, 12B, 12C:
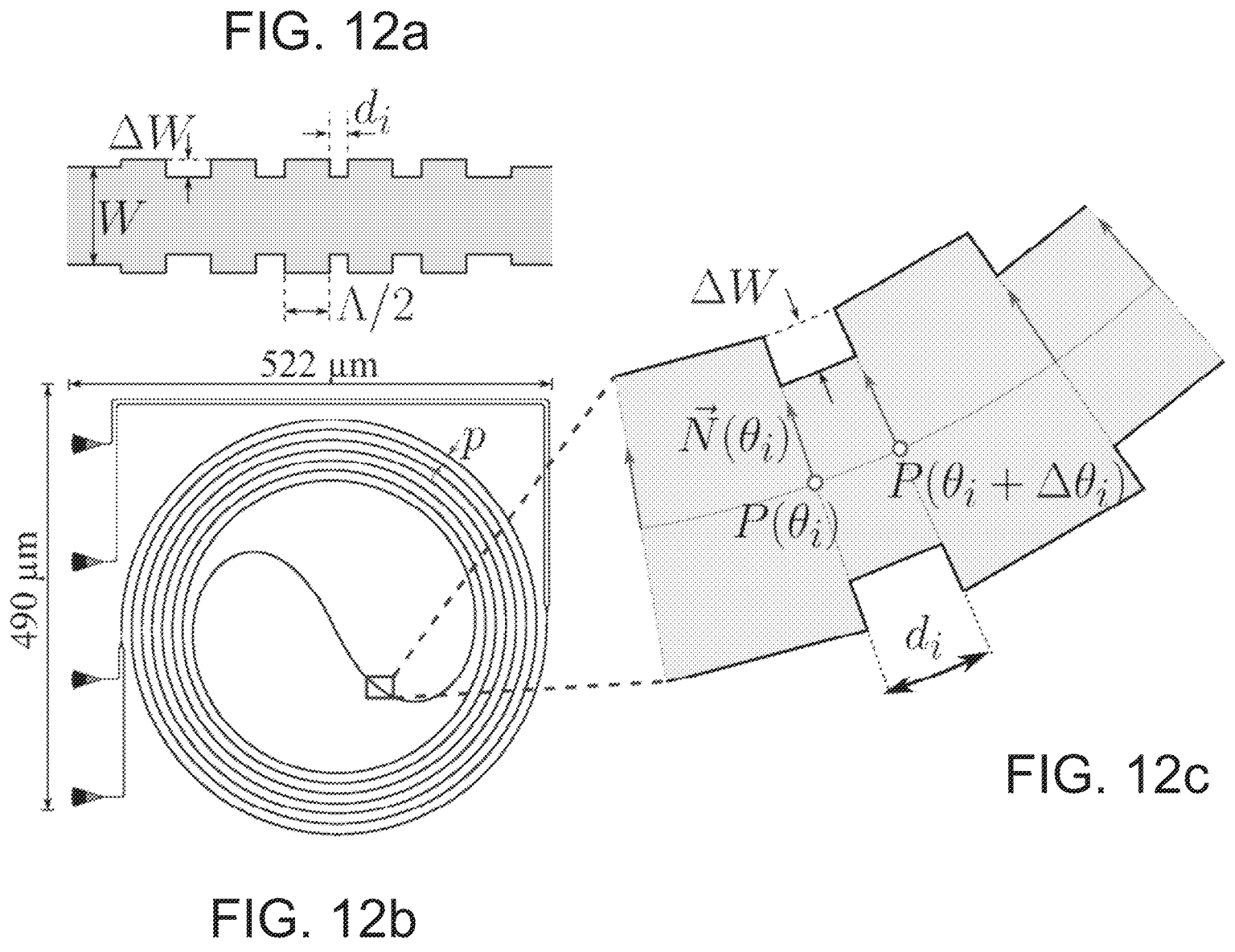
Figure 12D:
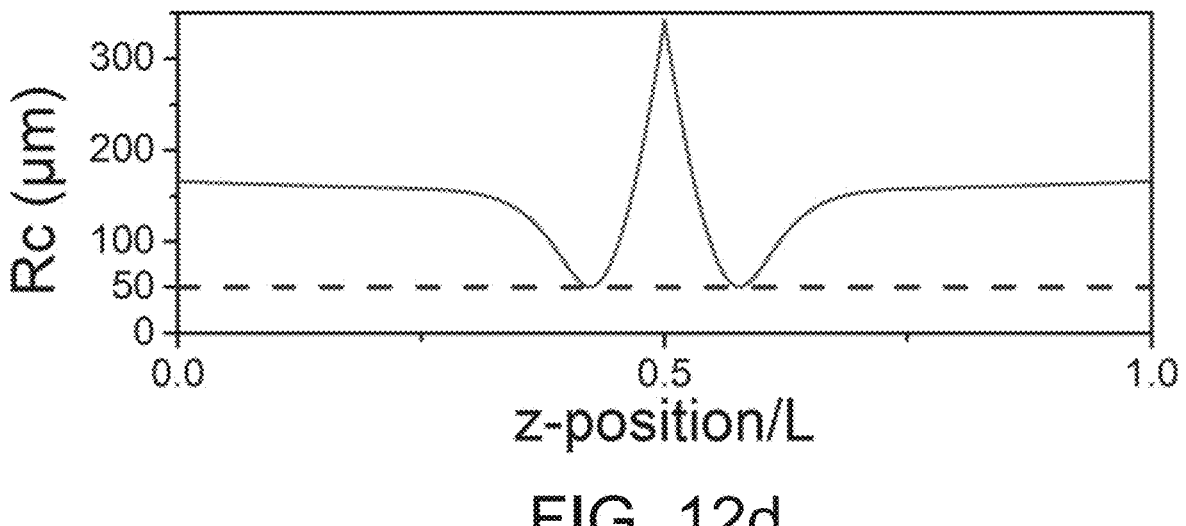
FIG. 12d illustrates the radius of curvature (Rc) along the spiral for p=11 μm, $R_0$=147 μm and α=0.4806.
Figure 12E:
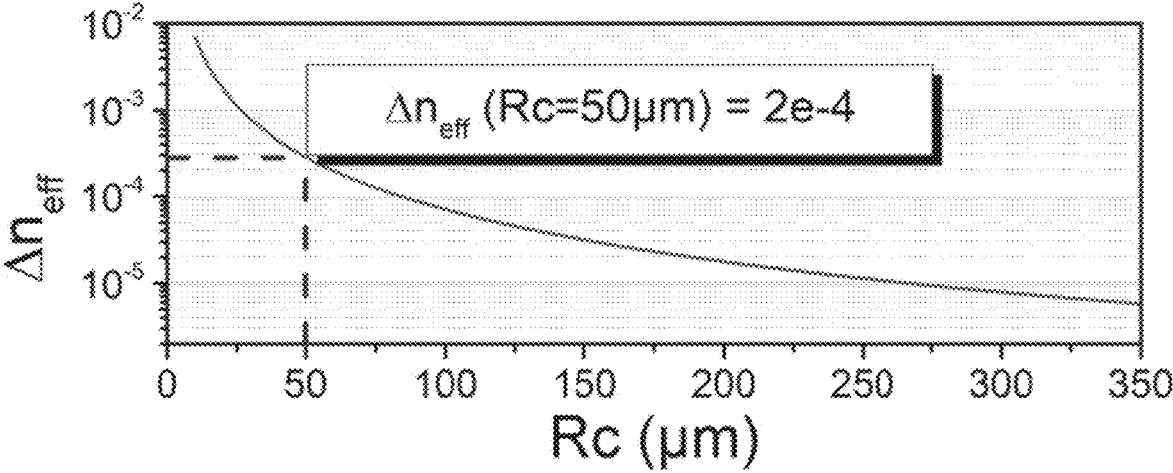
FIG. 12e illustrates the difference in effective refractive index between straight and curved waveguides ($\Delta n_{eff}$) as a function of Rc for a multimode waveguide with W=1 μm.

In some implementations, it may be challenging to realize a distortion-free response from cm-long waveguide Bragg gratings (WBGs) based on straight waveguides due to 1) limitation in the total area of the chip, and 2) the non-uniformities of fabrication process (e.g., variations in the thickness of the wafer and stitching errors in electron beam lithography). Referring to FIGS. 12a to 12e, to overcome this limitation, in some embodiments a spiral geometry may be employed, in particular to map ultra-long WBGs in a compact footprint. FIG. 12*a* shows the original linear corrugation pattern to be implemented (W: waveguide width; ΔW: corrugation width; Λ: grating period; $d_i$: distance between adjacent corrugations). By way of example, an Archimedean spiral in which the radius increases linearly with the angle θ may be considered, such as illustrated in FIG. 12*b*. Grating couplers are used to couple fundamental transverse-electric (TE) mode in the device and Y-splitters are used to get both transmitted and reflected signals. To ensure a smooth transition at the center of the spiral, an exponential horizontal shift is introduced to the design equations. Thus, the modified Cartesian coordinates may be given by $$\begin{cases} x(\theta) = \left(R_0 \mathrm{sgn}(\theta) + \dfrac{p}{\pi}\theta\right)\cos(\theta) - R_0\,\mathrm{sgn}(\theta)e^{-\frac{|\theta|}{\alpha}} \\ y(\theta) = \left(R_0\,\mathrm{sgn}(\theta) + \dfrac{p}{\pi}\theta\right)\sin(\theta) \end{cases} \quad \theta \in [-2\pi n_v, 2\pi n_v] \tag{8}$$

where p is the center-to-center separation between adjacent corrugations, illustrated in FIG. 12*b*, $R_0$ and α are two design parameters, and $n_v$ is the total number of turns in the spiral, which depends on the device length. The values of $R_0$ and α are chosen according to the desired minimum radio of curvature (Rc). FIG. 12*c* shows the mapping of the distance $d_i$ to the angle difference $\Delta\theta_i$, between the points $P(\theta_i)$ and $P(\theta_i+\Delta\theta_i)$. $\vec{N}(\theta_i)$ is the local normal vector in each point. FIG. 12*d* shows Rc along the spiral for p=11 μm, $R_0$=147 μm and α=0.4806. In the case of 1-μm-multimode waveguides, for Rc=50 μm, the difference in the effective refractive index ($\Delta n_{eff}$) between straight and curved waveguides is minimal, hence the introduced phase error is negligible (see FIG. 12*e*). The layout shown in FIG. 12*b* corresponds to a WBG with a device length of 0.9 cm. The total area of the spiral WBG is 0.25 mm², occupying nearly 5× less area compared to an equivalent straight WBG.

Accurate mapping from a straight WBG with varying distance between corrugations ($d_i$), (schematically illustrated in FIG. 12*a*), to the spiral geometry is needed to ensure distortion-free response. Therefore, respective $d_i$ values are mapped to a difference in angle, $\Delta\theta_i$, between adjacent corrugations in the spiral, calculated by numerically solving the following equation $$\int_{\theta_i}^{\theta_i+\Delta\theta_i} \sqrt{\left(\frac{dx}{d\theta}\right)^2 + \left(\frac{dy}{d\theta}\right)^2}\, d\theta = d_i \tag{9}$$

Next, the waveguide sidewalls are defined using the local normal vector $\vec{N}(\theta_i)$ and the desired ΔW, as shown in FIG. 12*c*. The mapping technique proposed here ensures realization of cm-long spiral Bragg gratings based on multimode waveguides with fully customizable amplitude and phase response in an ultra-compact mm² footprint.

One skilled in the art will readily understand that the example above is given for illustrative purposes only and that other spiral or non-linear configurations could be envisioned without departing from the scope of protection.

Device Implementations

In some implementations, the phase filters described above may be incorporated in a telecommunication system or in a device of such a system.

Figure 13:
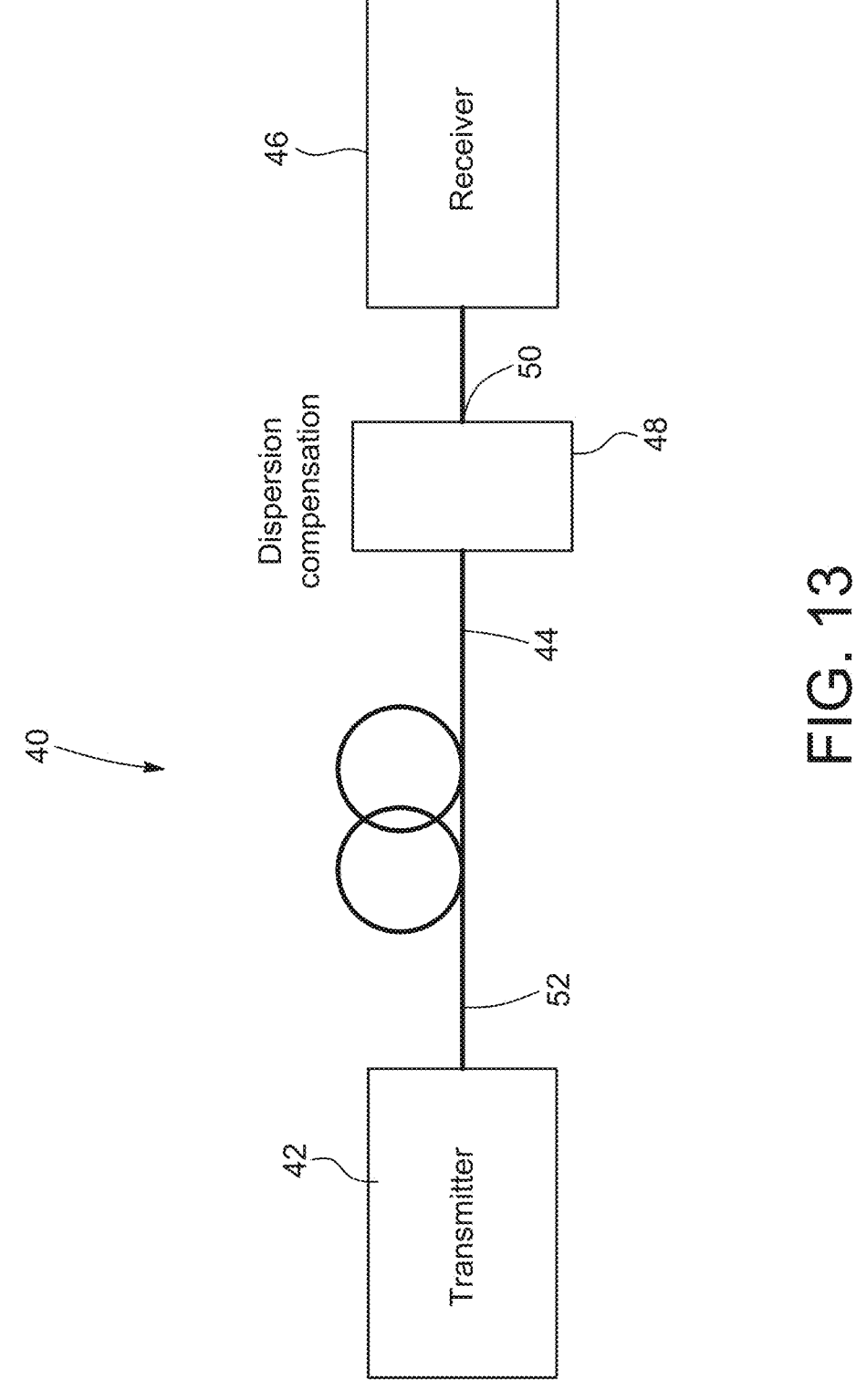
FIG. 13. A representative illustration of a dispersion compensation scheme in a optical fiber link.

Referring to FIG. 13, there is shown a telecommunication system 40 including a dispersion compensating scheme. The system 40 includes a transmitter 42 transmitting the telecommunication optical signal, an optical fiber link 44 carrying the signal and a receiver 46 receiving the optical signal for conversion to electrically represented data. A dispersion compensator 48 is provided at some point in a path of the optical signal. It will be understood that the dispersion compensator may be disposed at any point along the path of the optical signal. For example, the dispersion compensator 48 may be provided at the receiver end 50 of the optical fiber link 44, or at the transmitter end 52 of the optical fiber link, in a pre-compensation scheme. The dispersion compensator 48 may also be provided at intermediate point of the optical signal path, for example as part of a repeater. It will be readily understood the dispersion compensator 48 may be integrated into the chip of a transmitter, a receiver, a transmitter optical sub-assembly (TOSA), a receiver optical sub-assembly (ROSA), a transceiver or other device of the telecommunication system. In some embodiment, more than one dispersion compensator may be used in a telecommunication system to jointly compensate for the chromatic dispersion experienced by the telecommunication optical signal travelling along a given optical fiber link.

Figures 14, 15:
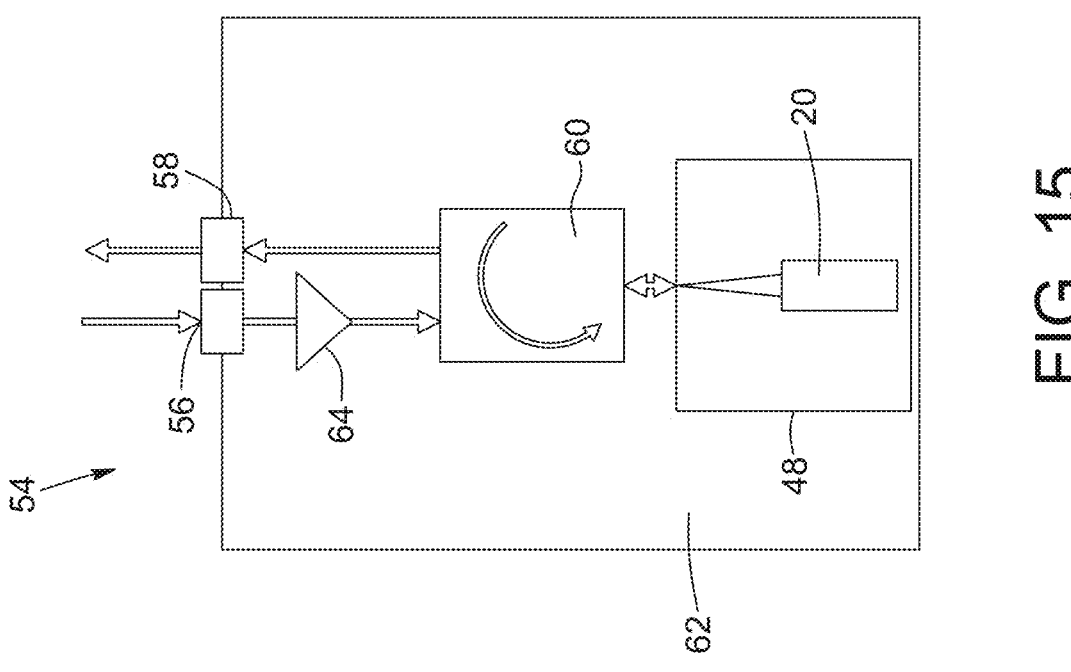
FIG. 14 is a schematized representation of a standalone dispersion compensation module incorporating a dispersion compensator according to one embodiment.
FIG. 15 is a schematized representation of a standalone dispersion compensation module incorporating a dispersion compensator according to another embodiment.

As will be readily understood, the dispersion compensator 48 may be integrated in a telecommunication system, in a variety of contexts. In some implementation, the dispersion compensator may be provided as a standalone dispersion compensation module 54, for example in a SFP (small form-factor pluggable) format. Referring to FIG. 14, one example of a configuration compatible with such an embodiment is shown. The illustrated standalone dispersion compensation module 54 for example includes side-by-side input and output ports 56 and 58, a WBG 20 according to a variant of the gratings described above, and a circulator 60 optically connecting the input port 56, output port 58 and WBG 20. A sleeve 62 may protect the optical component of the module, as well known in the art. Referring to FIG. 15, there is shown a variant configured for a multichannel application, for example including a WBG 20 according to the embodiment of FIGS. 11*a* and 11*b*, optionally using a spiral configuration such as shown in FIGS. 12*a* to 12*e*. An optical amplifier (OA) 64, such as a semiconductor optical amplifier (SOA) or Erbium-doped waveguide amplifier (EDWA) etc., is provided between the input port 56 and the circulator 60 (or alternatively between circulator 60 and the output port 56) to compensate the losses of the optical components in the module involving the WBG.

Figures 16A, 16B:
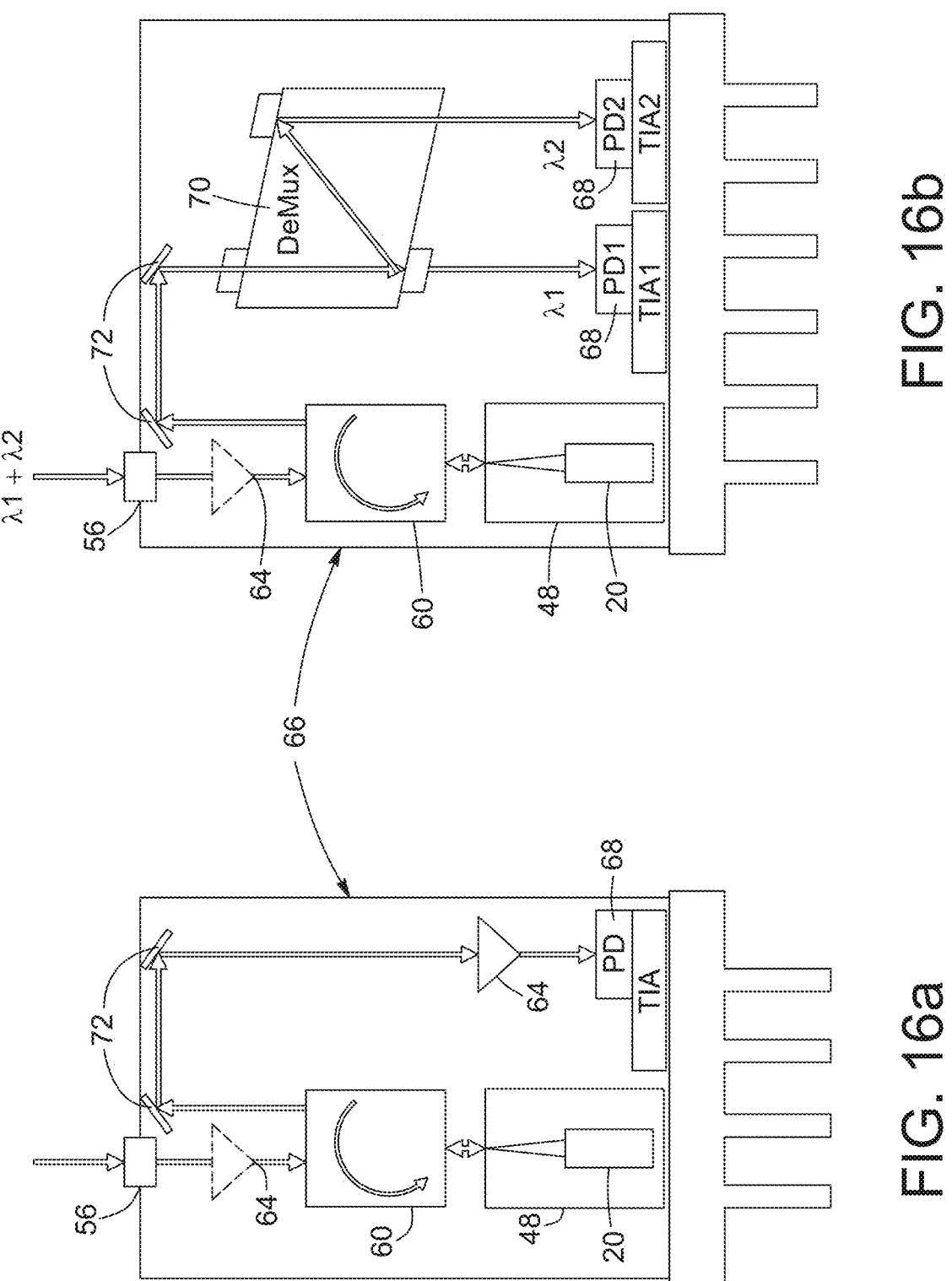
FIGS. 16a and 16b are schematized representations of dispersion compensators integrated in a ROSA (Receiver Optical Sub-Assembly) package, respectively configured for single channel and dual-channel compensation.

Referring to FIGS. 16*a* and 16*b*, in another example the dispersion compensator 48 may be integrated in a ROSA (Receiver Optical Sub-Assembly) package 66, respectively configured for single channel and dual-channel compensation. In the variant illustrated in FIG. 16*a*, the input optical signal is received at an input port 56. A circulator 60 optically connects the input port 58 with the WBG 20 of the dispersion compensator 48, and with a photodiode 68 for detection. An optical amplifier 64 may be provided between the circulator 60 and the photodiode 68, for example to provide dispersion and/or loss compensation. In some variants, the The optical amplifier 64 may alternatively be placed before the dispersion compensator 48 Additional optical components may be included in the ROSA package 66, such as mirrors 72, or a DeMUX 70 which could be used for multi-channel ROSAs, as for example shown for a two-channel case of FIG. 16*b*. One skilled in the art will readily understand that TOSA (Transmitter Optical Sub- Assembly) or BOSA (Bidirectional Optical Sub-Assembly) implementations are also considered within the scope of protection.

Figures 17A, 17B:
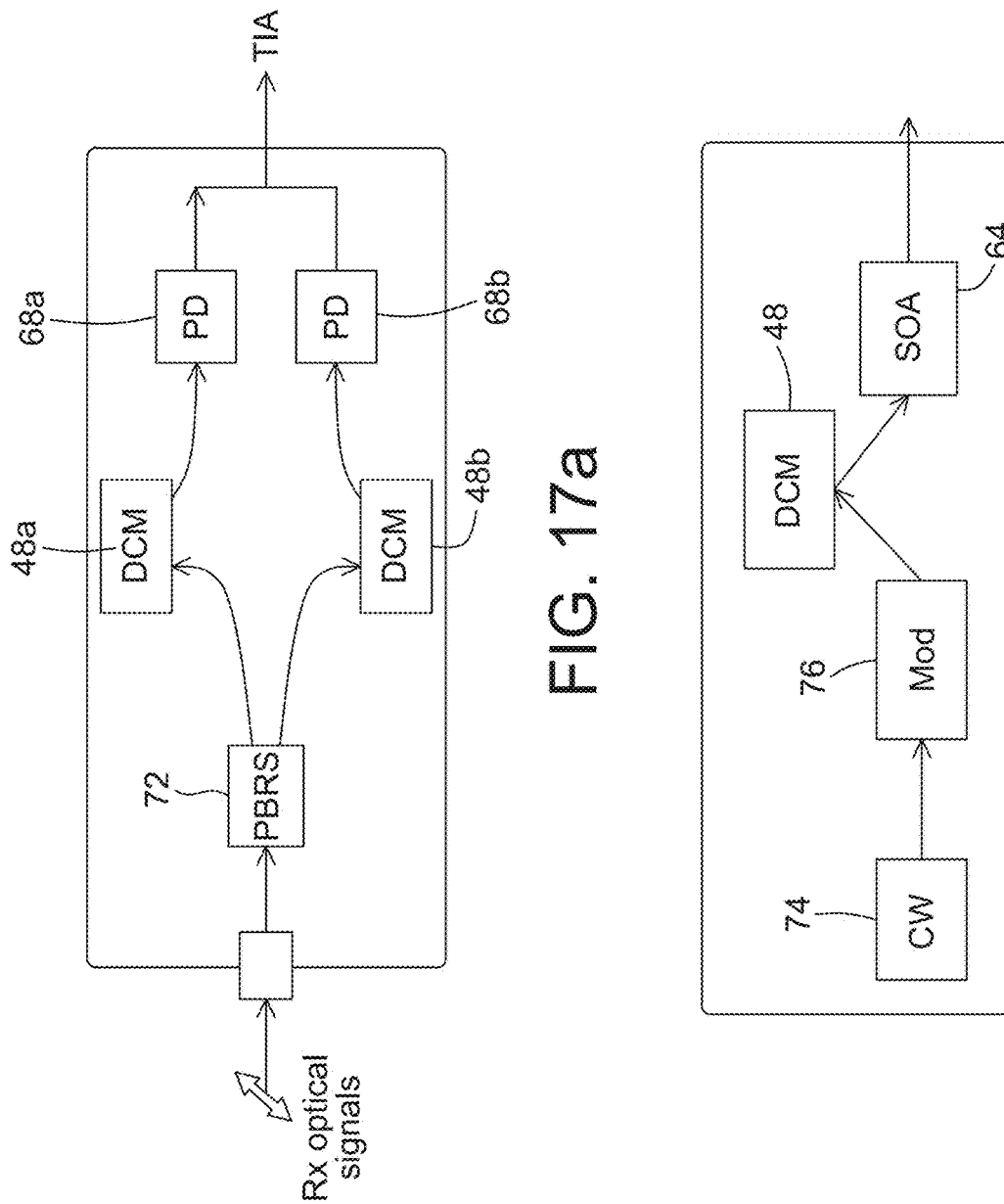
FIGS. 17a and 17b shown embodiments of dispersion compensators as described here integrated in SiPh circuits, respectively configured for a receiver integration and a transmitter integration.

Referring to FIGS. 17*a* and 17*b*, in other implementations, the dispersion compensator may be integrated in a circuit platform, such as for example a SiPh circuit or the like. By way of example, FIG. 17*a* shows a possible configuration for a receiver integration in which a polarization beam rotator-splitter 72 (PBRS) is used to spit the input signal into two polarization components compatible with the design of the parallel dispersion compensator 48*a* and 48*b*. The PBRS 72 may not be needed if the dispersion compensator 48 is designed to be polarization-insensitive. The signal is then directed to a pair of photodiodes 68*a*, 68*b*. FIG. 17*b* shows a possible configuration for a transmitter integration in which the optical signal generated by a cw laser source 74 and modulated by an optical modulator 76 is pre-compensated by a dispersion compensator as described herein and amplified by a optical amplifier 64 before launching into an optical fiber link.

As will be readily understood by one skilled in the art, the design of such dispersion compensators should aim to minimize losses and mitigate polarization issues. For example, using various waveguide design techniques and/or low-loss material platforms (e.g., SiN) may minimize both.

In conclusion, a discrete spectral phase filtering solution for arbitrary GVD compensation of telecommunication data signals is proposed. The proposed technique provides the needed performance (in terms of Q-factor or BER estimates) for a variety of modulation formats (e.g., RZ and NRZ) using mm-long practically feasible WBG-based designs (e.g., practically realizable in a SOI or other platform of interest). Compared to traditional waveguide/fiber-based implementations for dispersion compensation, this strategy avoids the spectral phase accumulation of a dispersive line, which translates to highly compact designs, enabling realization of on-chip GVD compensation with specifications that are commensurate with practical requirements. For instance, using this technique, mm-long compact phase filters have been designed for SOD compensation of a single 100-GHz WDM channel (carrying a 50-Gbps NRZ-OOK signal) after propagation through a 16 km section of a standard SMF. Such designs can compensate for PAM-4 signals as well, albeit for shorter transmission fiber lengths. The proposed discrete phase filters are highly versatile and can compensate for even the higher-order dispersive terms (TOD and FOD) of a standard SMF, which are especially critical for high bit-rate RZ signals. For instance, compact devices can be realized for targeting only the TOD and FOD compensation of an 80-Gbps RZ-OOK data stream consisting of 1-ps FWHM Gaussian pulses after propagation through 100 km of standard SMF-offering at least ~3× reduction in device length compared to conventional waveguide-based implementations (e.g., a CWBG-based design).

As will be readily understood by one skilled in the art, the proposed design framework is platform-agnostic and, as such, can be easily extended to other on-chip integrated platforms, such as silicon nitride, lithium niobate, etc. These platforms offer significantly lower waveguide insertion losses (<0.1 dB/cm) compared to silicon and are relatively more immune to fabrication-induced imperfections (e.g., random fluctuations in waveguide width) due to reduced modal overlap with waveguide sidewalls. Some embodiments may allow the realization of phase filter designs with highly improved frequency resolution, down to 1 GHz— thus, further extending the range of GVD and BW values that can be compensated for using this proposed solution.

Of course, numerous modifications could be made to the embodiments described above without departing from the scope of protection as defined in the appended claims.

The invention claimed is:

1. A method of making a dispersion compensating phase filter for compensating for chromatic dispersion accumulated by a telecommunication optical signal when travelling in a dispersive line, the method comprising:

a) determining a target dispersion compensating phase profile of a channel of the telecommunication optical signal, said determining comprising:

i. discretizing a phase profile of the dispersive line into a plurality of frequency sub-bands over a bandwidth of the channel, each frequency sub-band having a width selected in view of compensating the chromatic dispersion;

ii. for each of said frequency sub-bands, computing an average phase value of the phase profile of the dispersive line;

iii. converting each average phase value to an equivalent $2\pi$-bound phase value for each of said frequency sub-bands; and iv. constructing the target dispersion compensating phase profile across the full bandwidth of the channel as the equivalent $2\pi$-bound phase value over each frequency sub-band;

b) determining spatial parameters of a physical spectral filtering structure having a spectral filtering phase profile corresponding to the target dispersion compensating profile; and c) manufacturing said physical spectral filtering structure using said spatial parameters.

2. The method according to claim 1, wherein the phase profile of the dispersive line comprises a second-order dispersion term.

3. The method according to claim 1, wherein the phase profile of the dispersive line comprises at least one of a third-order dispersion term and a fourth-order dispersion term.

4. The method according to claim 1, wherein the discretizing of the phase profile of the dispersive line comprises selecting the width of each frequency sub-bands such that the phase profile of the dispersive line is constant over said width, and/or such that said width provides a target net group delay excursion of the dispersive line.

5. The method according to claim 1, wherein the discretizing of the phase profile of the dispersive line comprises selecting the width of each frequency sub-bands within a range having:

a minimum size dictated by a manufacturing technology platform used for the manufacturing of the physical spectral filtering structure; and a maximum size dictated by the chromatic dispersion to be compensated.

6. The method according to claim 1, wherein the frequency sub-bands of the discretized phase profile of the dispersive line are coterminous.

7. The method according to claim 1, wherein each average phase value of the phase profile of the dispersive line is computed as the center of the corresponding frequency sub-band.

8. The method according to claim 1, wherein converting each average phase value comprises dividing said average phase value by $2\pi$ and taking a remainder of said dividing as the equivalent $2\pi$-bound phase value.

9. The method according to claim 1, wherein the spectral filtering structure comprises a Bragg grating.

10. The method according to claim 9, wherein the Bragg grating is a waveguide Bragg grating (WBG) manufactured on a waveguide chip, and determining spatial parameters of the spectral filtering structure comprises modulating a distance between consecutive corrugations along the WBG.

11. The method according to claim 9, wherein determining spatial parameters of a spectral filtering structure comprises using a spectral transfer function, and determining spatial parameters of a physical spectral filtering structure comprises adding a phase-only sampling function to a refractive index profile of the Bragg grating, said phase-only sampling function being designed to extend a dispersion compensation ability of the filter to multiple channels of the telecommunication optical signal.

12. The method according to claim 10, wherein the WBG has a spiral geometry.

13. The method according to claim 9, wherein the Bragg grating is a Fiber Bragg Grating (FBG) manufactured in an optical fiber.

14. The method according to claim 1, wherein the spectral filtering structure comprises concatenated micro-elements manufactured on a waveguide chip.

15. A dispersion compensating phase filter for compensating for chromatic dispersion accumulated by a target telecommunication optical signal when travelling in a dispersive line, the filter comprising a physical spectral filtering structure having spatial parameters providing a spectral filtering phase profile corresponding to a target dispersion compensating phase profile of a channel of the telecommunication optical signal, said target dispersion compensating phase profile being determined from:

a. discretizing a phase profile of the dispersive line into a plurality of frequency sub-bands over a bandwidth of the channel, each frequency sub-band having a width selected in view of compensating the chromatic dispersion;

b. for each of said frequency sub-bands, computing an average phase value of the phase profile of the dispersive line;

c. converting each average phase value to an equivalent $2\pi$-bound phase value for each of said frequency sub-bands; and d. constructing the target dispersion compensating phase profile across the full bandwidth of the channel as the equivalent $2\pi$-bound phase value over each frequency sub-band.

16. The method dispersion compensating phase filter according to claim 15, wherein the spectral filtering structure comprises a Bragg grating.

17. The dispersion compensating phase filter according to claim 16, wherein the Bragg grating is a waveguide Bragg grating (WBG) manufactured on a waveguide chip.

18. The dispersion compensating phase filter according to claim 16, wherein the Bragg grating is a Fiber Bragg Grating (FBG) manufactured in an optical fiber.

19. The dispersion compensating phase filter according to claim 17, wherein the WBG has a spiral geometry.

20. The dispersion compensating phase filter according to claim 15, wherein the spectral filtering structure comprises concatenated micro-elements manufactured on a waveguide chip.

21. A telecommunication system comprising:

A transmitter for transmitting a telecommunication optical signal;

A receiver for receiving the telecommunication signal;

A optical fiber link for carrying the telecommunication optical signal and having a transmitter end optically coupled to the transmitter and a received end optically coupled to the receiver; and A dispersion compensator provided in a path of the telecommunication optical signal and comprising a dispersion compensating phase filter according to claim 19 configured to compensate for chromatic dispersion accumulated by the telecommunication optical signal when travelling along the optical fiber link between the transmitter and the receiver.

22. The telecommunication system according to claim 21, wherein the dispersion compensator is provided at the transmitter end of the optical fiber link or at the receiver end of the optical fiber link.

23. The telecommunication system according to claim 21, comprising a standalone dispersion compensation module including said dispersion compensator.

24. The telecommunication system according to claim 23, wherein the dispersion compensator comprises a waveguide Bragg grating (WBG), and the standalone dispersion compensation module further comprises:

side-by-side input and output ports; and a circulator optically connecting the input port, output port and the WBG.

25. The telecommunication system according to claim 24, wherein the dispersion compensator is integrated in a ROSA (Receiver Optical Sub-Assembly) package or in a circuit platform.

* * * * *